United States Patent [19]

Nakase et al.

[11] 4,199,938

[45] Apr. 29, 1980

[54] METHOD OF OPERATING A THREE-WAY CATALYST FOR INTERNAL COMBUSTION ENGINES

[75] Inventors: Takamichi Nakase, Gamagori; Tadashi Hattori, Okazaki; Junichiro Naito, Toyokawa; Kenji Kondo, Hoi all of Japan

[73] Assignee: Nippon Soken, Inc., Nishio, Japan

[21] Appl. No.: 863,579

[22] Filed: Dec. 22, 1977

[30] Foreign Application Priority Data

Dec. 26, 1976 [JP] Japan ................................. 51-157284
Feb. 28, 1977 [JP] Japan ................................. 52-21084
Mar. 18, 1977 [JP] Japan ................................. 52-30855
Oct. 12, 1977 [JP] Japan ................................. 52-122000

[51] Int. Cl.$^2$ ................................................ F01N 3/15
[52] U.S. Cl. ........................................ 60/274; 60/289; 60/290; 60/299
[58] Field of Search ................ 60/274, 276, 285, 290, 60/289, 299

[56] References Cited

U.S. PATENT DOCUMENTS

| | | | |
|---|---|---|---|
| 3,768,259 | 10/1973 | Carnahan | 60/276 |
| 3,885,019 | 5/1975 | Matsushita | 423/213.2 |
| 3,962,867 | 6/1976 | Ikeura | 60/290 |
| 4,024,706 | 5/1977 | Adawi | 60/274 |

Primary Examiner—Douglas Hart
Attorney, Agent, or Firm—Cushman, Darby & Cushman

[57] ABSTRACT

A method of operating a three-way catalyst which contains an oxygen storage material and which is mounted on the exhaust system of an internal combustion engine is disclosed. In order to operate the three-way catalyst effectively, the air-fuel ratio of the mixture supplied to the engine is set to be richer than the stoichiometric ratio, and secondary air is intermittently supplied by an air pump into the exhaust system upstream of the three-way catalyst, thereby to alternately vary the air-fuel ratio of the exhaust gases supplied to the three-way catalyst to become rich and lean with respect to the stoichiometric ratio.

8 Claims, 27 Drawing Figures

FIG. 3A
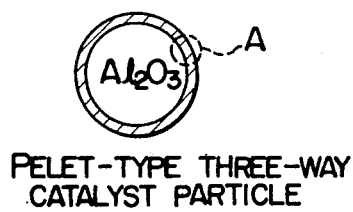
PELET-TYPE THREE-WAY
CATALYST PARTICLE
FIG. 3B
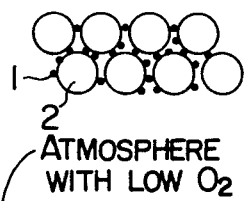
ATMOSPHERE
WITH LOW O₂
LEAN GAS
(HIGH O₂ PARTIAL PRESSURE)
O₂ STORED →
STORED O₂ MOLECULES
FIG. 3C
↕
↓ O₂ DISCHARGED    ↑ O₂ STORED
RICH GAS
(LOW O₂ PARTIAL PRESSURE)
O₂ DISCHARGED →
FIG. 3D
DISCHARGED O₂ MOLECULES    ATMOSPHERE WITH HIGH O₂ PARTIAL PRESSURE
FIG. 4
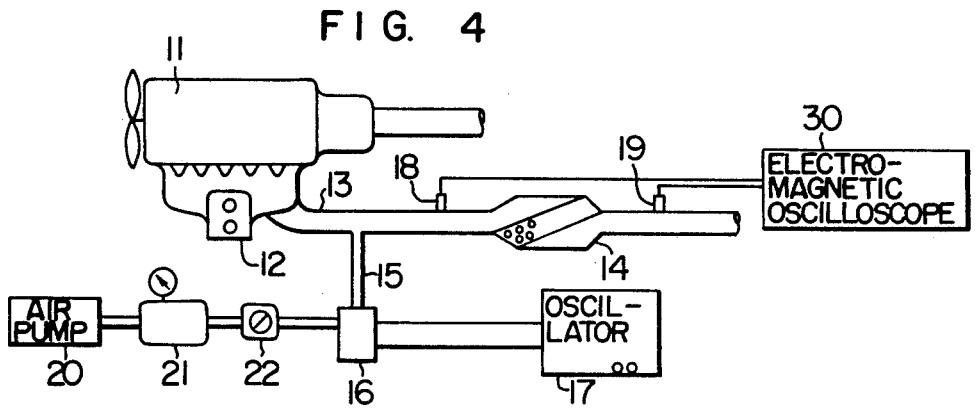

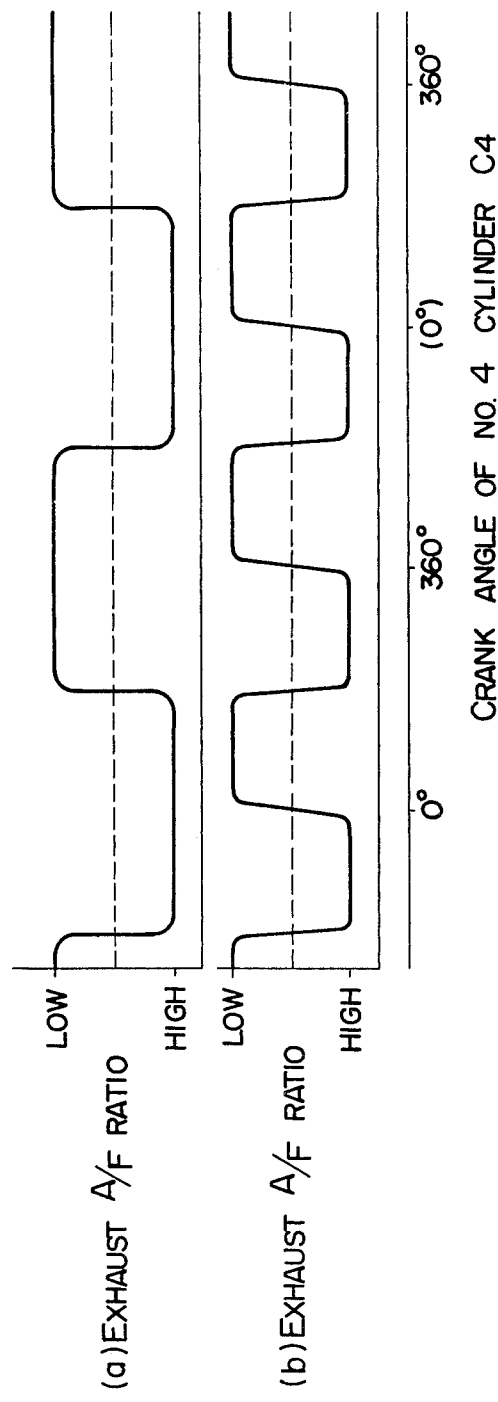

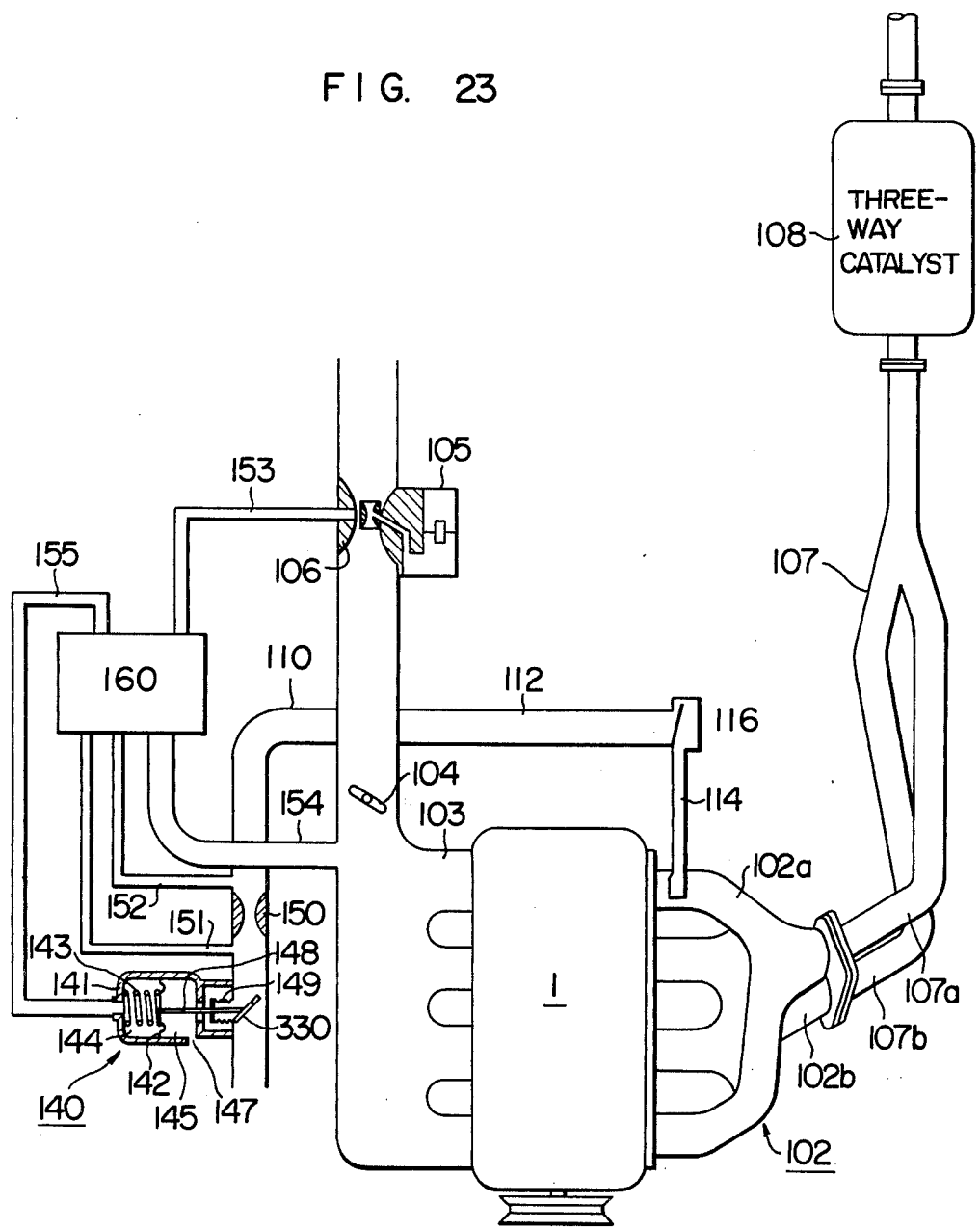

METHOD OF OPERATING A THREE-WAY CATALYST FOR INTERNAL COMBUSTION ENGINES

BACKGROUND OF THE INVENTION

1. Field of the Invention

The present invention relates to a method of operating a three-way catalyst of the type which is well known as an exhaust gas purifying device for internal combustion engines and which is mounted in the exhaust system of an internal combustion engine. More particularly, in an internal combustion engine having a three-way catalyst of the type which is mounted in the exhaust system of the engine and containing an element having an oxygen storage capacity (oxygen storage material), a method of operating the three-way catalyst wherein the air-fuel ratio of the air-fuel mixture in the engine intake system (i.e., the mixture supplied to the engine) is set smaller than the stoichiometric ratio, that is, the mixture strength or richness is set on the rich side, and secondary air is supplied intermittently at a certain frequency into the upstream side of the three-way catalyst in the exhaust system so as to alternately vary the air-fuel ratio of the exhaust gases to the rich and lean sides with the stoichiometric ratio as a threshold value.

2. Description of the Prior Art

As a means of simultaneously removing the objectionable components ($CO$, $HC$, $NO_x$) contained in the exhaust gases discharged from an internal combustion engine, the use of a three-way catalyst has been studied extensively in view of the stricter regulations on various exhaust emissions, and many different types of related systems have also been proposed.

As will be seen from the graph shown in FIG. 1 showing the relation between the purification efficiency and the air-fuel ratio, the range within which the three-way catalyst is capable of purifying the three components ($CO$, $HC$, $NO_x$) with high efficiency (i.e., the range of air-fuel ratios in which a high purification percentage of over 80% can be attained and it will hereinafter be referred to as an A/F window) is confined to a very limited range around the stoichiometric air-fuel ratio. As a result, the heretofore proposed exhaust emission control system of the type employing a three-way catalyst are so designed that an air-fuel ratio detector for detecting the stoichiometric ratio is mounted in the exhaust system, and mixture producing means (e.g., the carburetor or electronically controlled fuel injection system) in the intake system is feedback controlled, thus maintaining the air-fuel ratio of mixtures at around the stoichiometric ratio and thereby allowing the three-way catalyst to operate effectively.

With this air-fuel ratio feedback control system, however, it is impossible to always maintain the air-fuel ratio at the stoichiometric one, and the actual air-fuel tends to vary alternately to the rich and lean sides with the stoichiometric ratio as a threshold value. The range or frequency of such variations varies considerably in dependence on the engine operating conditions. As a result, this air-fuel ratio feedback control system is also incapable of ensuring effective utilization of the three-way catalyst.

Recently, catalysts have been developed which are capable of operating with high purification percentages against some variation in the air-fuel ratio. For example, as shown in Japanese Laid-Open Patent Application Publications Tokukai Sho 52-56216, 52-56217, etc., the techniques have been proposed by which platinum (Pt) and rhodium (Rh) in proper proportions are carried on a catalyst bed so as to increase the A/F window of a three-way catalyst. Also disclosed in Japanese Laid-Open Patent Application Publication 52-27087 is the technique by which an oxygen storage material is added to a catalyst so as to similarly ensure an increased A/F window range.

However, these prior art techniques are all designed to improve on the catalysts themselves, and none of these prior art techniques suggest or teach how to operate such three-way catalyst to ensure the most effective operation of the three-way catalyst or how to increase the range of A/F windows for the three-way catalysts.

On the other hand, methods of operating threeway catalysts so as to ensure the effective operation thereof are known in the art as, for example, disclosed in U.S. Pat. No. 4,024,706. In accordance with this U.S. Patent, the air-fuel ratio of the mixture supplied to an engine is varied alternately to the rich and lean sides with the stoichiometric air-fuel ratio as a threshold value to thereby increase the A/F window range of the catalyst. However, the A/F window range that can be obtained with the operating method of this U.S. Patent is as small as 0.18 units in terms of gasoline air-fuel ratio thus making it necessary to employ a feedback control system employing an air-fuel ratio detector, and the method cannot be considered as a satisfactory method of operating a three-way catalyst.

Moreover, the method of the U.S. Patent is disadvantageous in that since the air-fuel ratio of the mixture supplied to the engine (i.e., the mixture in the intake system) is varied alternately to the rich and lean sides, the engine operation tends to become unstable with increase in the variation of the air-fuel ratio and also its effects increase with decrease in the frequency of the variations. Thus, the three-way catalyst operating method disclosed in the U.S. Patent has a deteriorating effect on the engine operation.

SUMMARY OF THE INVENTION

It is an object of the present invention to provide an improved method of operating a three-way catalyst, which ensures an effective operation of the three-way catalyst.

In accordance with a feature of this invention, there is thus provided a method of operating a three-way catalyst wherein a three-way catalyst containing a metal (material) having an oxygen storage capacity is mounted in the exhaust system of an internal combustion engine, the air-fuel ratio of the mixture supplied to the engine is set on the rich side as compared with the stoichiometric ratio, e.g., 13:1, and secondary air is intermittently supplied into the exhaust system upstream of the threeway catalyst, thus alternately varying the air-fuel ratio of the exhaust gases supplied to the three-way catalyst to the rich and lean sides with the stoichiometric ratio as a threshold value, thus allowing the three-way catalyst to operate effectively.

It is another object of the present invention to provide a method of operating a three-way catalyst wherein when the amount of variation of the air-fuel ratio to each of the rich and lean sides is the same, the period (cycle) during which the air-fuel ratio is held on the lean side is reduced as compared with the period (cycle) during which the air-fuel ratio is held on the rich side, namely, the average air-fuel ratio is controlled on the rich side as compared with the stoichiometric ratio, thus ensuring more effective operation of the three-way catalyst.

It is still another object of the present invention to provide a method of operating a three-way catalyst wherein the catalyst bed of the three-way catalyst comprises a catalyst bed of a monolithic type, whereby ensuring effective operation of the three-way catalyst even when the air-fuel ratio of the exhaust gases varies at higher frequencies (e.g., 10 Hz and over).

With these and other objects in view, the invention consists in the method and the construction hereinafter fully described and illustrated in the accompanying drawings, and set forth in the claims hereto appended, it being understood that various changes in the operation, form, proportion and minor details of construction, within the scope of the claims, may be restored to without departing from the spirit of the invention or sacrificing any of the advantages thereof.

BRIEF DESCRIPTION OF THE DRAWINGS

FIGS. 3A to 3D are schematic diagrams showing the oxygen storage and emitting operations of a three-way catalyst containing an oxygen storage material, and FIGS. 3B to 3D correspond to an enlargement of the portion A of FIG. 3A.

FIG. 4 is a schematic diagram showing the apparatus used in the experiments of this invention.

FIG. 22 is a characteristic diagram showing the relationship between the exhaust gas air-fuel ratios on the inlet side of the first exhaust pipe 107a and the three-way catalyst 108 in the third embodiment and the engine crank angle.

FIG. 23 is a schematic diagram showing the general construction of a fourth embodiment of the apparatus for performing the method of this invention.

DESCRIPTION OF THE PREFERRED EMBODIMENTS

Before describing the preferred embodiments of this invention, the purifying action of a three-way catalyst utilizing an oxygen storage capacity will be described.

Figure 2:
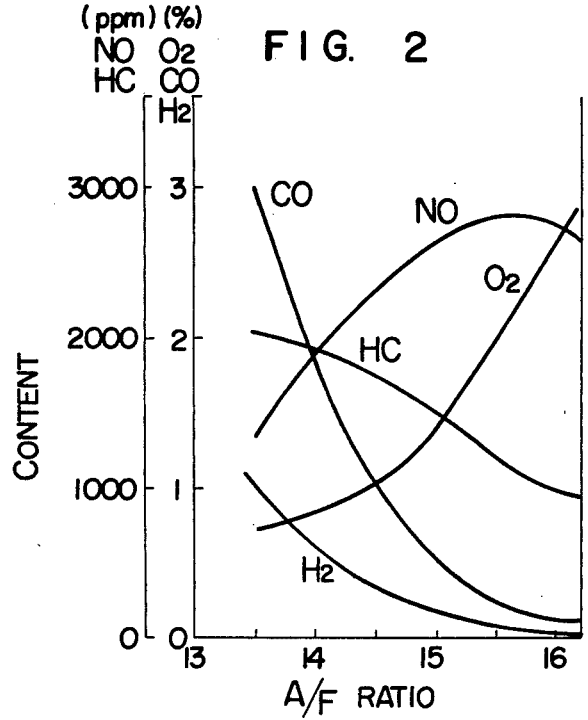
FIG. 2 is a graph showing the variations in the exhaust gas composition obtained when the air-fuel ratio of the mixtures supplied to an engine were varied from 13:1 up to 16:1.

FIG. 2 shows the effect on the exhaust gas composition of an internal combustion engine of the variation in the air-fuel ratio of the mixture supplied to the engine. As will be seen from the Figure, the $O_2$ and CO contents vary rapidly at around the stoichiometric air-fuel ratio which allows the three-way catalyst to operate with maximum efficiency. The reactions which take place in the three-way catalyst can be given by the following reaction formulas:

$$CO + \tfrac{1}{2} O_2 \longrightarrow CO_2 \tag{1}$$

$$H_2 + \tfrac{1}{2} O_2 \longrightarrow H_2O \tag{2}$$

$$C_nH_m + \tfrac{4n+m}{4} O_2 \longrightarrow nCO_2 + \tfrac{m}{2} H_2O \tag{3}$$

$$CO + NO \longrightarrow \tfrac{1}{2} N_2 + CO_2 \tag{4}$$

$$H_2 + NO \longrightarrow \tfrac{1}{2} N_2 + H_2O \tag{5}$$

-continued

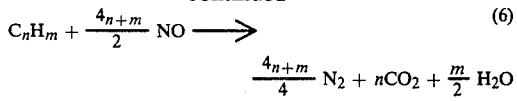

$$\frac{4n+m}{4} N_2 + nCO_2 + \frac{m}{2} H_2O$$

Figure 1:
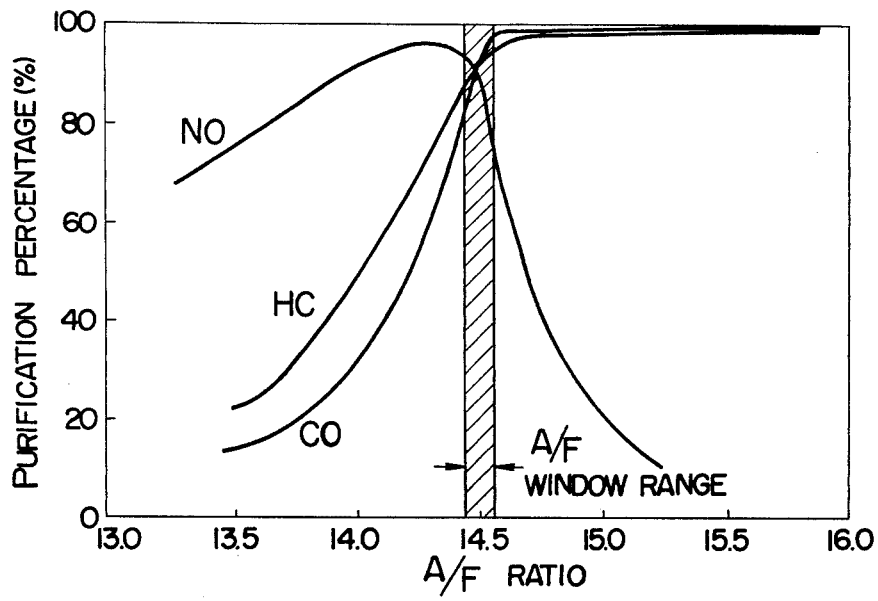
FIG. 1 is a graph showing the relationship between the purification percentage of an ordinary three-way catalyst and the air-fuel ratio with respect to the individual exhaust components.

The formulas (1) to (3) represent oxidation reactions and the formulas (4) to (6) represent reduction reactions. These reactions simultaneously progress in the three-way catalyst. While three-way catalysts comprising Pt-Rh metals are presently known in the art, their effective operating ranges (A/F window ranges) are extremely limited as will be seen from FIG. 1 (usually on the order of 0.05 to 0.1 unit in terms of air-fuel ratio unit). As will be seen from the composition diagram of FIG. 2, this fact means that particularly in consideration of the variation of the $O_2$ content, with the stoichiometric air-fuel ratio as a threshold value, the oxidation reactions of the formulas (1) to (3) occur first on the lean side, and the reduction reactions of the formulas (4) to (6) occur first on the rich side. Consequently, in the case of the former, CO, $H_2$ and $C_nH_m$ which are necessary for the reactions of the formulas (4) to (6) will be removed thus preventing the reduction reaction of NO, and in the case of the latter, while the reduction reactions of the formulas (4) to (6) will be promoted by virtue of CO, $H_2$ and $C_nH_m$ which are present in far excess of the equivalent amounts with repsect to NO, the amount of $O_2$ which must react with the remaining CO, $H_2$ and $C_nH_m$ after their reaction with NO will be less than the equivalent amount, thus preventing the oxidation reactions of the formulas (1) to (3). It will thus be seen that since the three components $O_2$, CO and $H_2$ whose contents rapidly vary at around the stoichiometric ratio the oxidation and reduction reactions of the formulas (1) to (6) tend to be prevented from simultaneously occurring. If the contents of these components are caused to change slowly with practically the same composition (CO, NO, HC, $H_2$, $O_2$) as the stoichiometric mixture, it would be possible to increase the effective operating range (A/F window range) of the three-way catalyst. However, unless the combustion reaction of an internal combustion engine is changed considerably thus producing the desired exhaust composition, these desired results cannot be expected and it is in fact almost impossible to obtain these results.

The previously mentioned prior art techniques have been developed with the intention of attaining these desired effects by means of catalysts. These prior art techniques are designed to obtain the desired effects by means of the $O_2$ content, and in addition to the Pt-Rh catalytic metals which effect the reactions of the formulas (1) to (6), three-way catalysts are employed which contain an oxygen storage material having by itself the ability to store (or adsorb) $O_2$, such as, the well known lanthanid group ($CeO_2$, $La_2O_3$, etc.), n-type semiconductor (CuO, ZnO, $ZrO_2$, etc.), or the like. While such additional material itself does not contribute to the reactions of the formulas (1) to (6), the material functions in such a manner that in response to the variation of the partial pressure of oxygen in the exhaust gas composition. It stores oxygen on the lean side in which the oxygen partial pressure is high and it discharges the stored oxygen on the rich side in which the oxygen partial pressure is low, thus smoothly varying the oxygen partial pressure (content) on the catalyst active surface. Thus, in the case of a system in which the air-fuel ratio of the mixtures supplied to the engine is alternately varied to the rich and lean sides, the atmosphere on the catalyst active surface is caused to approximate that of the stoichiometric mixture and thereby to increase the effective operating range (A/F window range) of the threeway catalyst.

FIGS. 3A through 3D schematically show the storage and discharge of oxygen by a three-way catalyst containing an oxygen storage material. FIG. 3A shows a pellet-type three-way catalyst particle comprising a catalyst bed made of $\gamma$-alumina ($Al_2O_3$) and a PTRh catalytic metal and an oxygen storage material which are carried on the catalyst bed, and FIG. 3B shows schematically the arrangement of the catalytic metal 1 and the oxygen storage material 2. FIG. 3C shows the manner in which oxygen ($O_2$) 3 in the exhaust gases is stored (adsorbed) by the oxygen storage material 2 when the exhaust gas atmosphere is on the lean side. FIG. 3D shows the manner in which the stored oxygen 3 is discharged from the oxygen storage material 2 into the exhaust gases when the exhaust gas atmosphere is on the rich side. Consequently, even when the exhaust gas atmosphere is on the lean side, the atmosphere in the vicinity of the catalytic metal 1 is maintained in the condition obtainable at around the stoichiometric ratio by virtue of the fact that the extra oxygen 3 is stored in the oxygen storage material 2. However, when the exhaust gas atmosphere is on the rich side, the atmosphere around the catalytic metal 1 is similarly maintained in the condition obtainable at around the stoichiometric ratio by virtue of the discharged oxygen.

In this way, the added oxygen storage material serves the function of adjusting the exhaust gas atmosphere brought near the catalytic metal, so that even if the air-fuel ratio is varied somewhat, the atmosphere around the catalytic metal can be maintained in the condition obtainable at around the stoichiometric ratio, thus increasing the A/F window range.

The test apparatus used in the various experiments conducted in accordance with the invention will now be described with reference to FIG. 4. In the Figure showing schematically the apparatus, numeral 11 designates a 2000 cc, four-cycle, sixcylinder, gasoline engine having a carburetor 12. Disposed in an exhaust pipe 13 is a three-way catalyst 14 containing an oxygen storage material. The threeway catalyst 14 is of the pellet type in which the catalyst bed is made of $\gamma$-alumina ($\gamma$-$Al_2O_3$), carrying thereon 1.5 g/l of Pt-Rh catalytic metal and 20 g/l of cerium oxide ($CeO_2$) as an oxygen storage material and packed in a 2.5 l case. An air supply pipe 15 for supplying secondary air opens into the exhaust pipe 13 upstream of the three-way catalyst 14. Numeral 16 designates an electromagnetic value mounted in the air supply pipe 15 to open and close the supply pipe 15 in response to the signals from an oscillator 17. An air pump 20 of the known type is used as a source of secondary air, and the air from the pump 20 is directed to the electromagnetic valve 16 through an air pressure regulator 21 and an opening regulator 22. Air-fuel ratio detectors 18 and 19 of the known type are disposed respectively on the upstream and downstream sides of the three-way catalyst 14 and the detector outputs are measured by an electromagnetic oscilloscope 30. The fuel used is gasoline with the stoichiometric air-fuel ratio of 14.5:1. The operating conditions of the engine 11 include the rotational speed of 1600 rpm and intake vacuum of −375 mmHg.

EXPERIMENT 1

Using the above-described apparatus of FIG. 4 and maintaining the air-fuel ratio of the mixture produced in the carburetor 12 at 13:1, the electromagnetic valve 16 was held in the ON (open) position and secondary air was gradually supplied into the exhaust pipe 13. The resulting purification percentages of the exhaust gas components are shown by the broken lines in FIG. 5.

Figure 5:
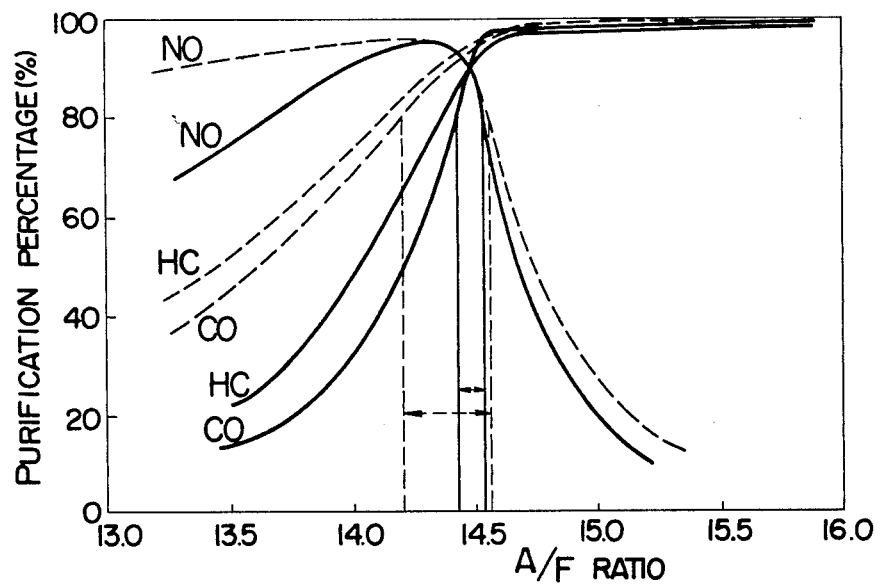
FIG. 5 is a graph showing the purification percentages of the exhaust gas components obtained when secondary air was gradually supplied to the upstream side of the three-way catalyst thus varying the air-fuel ratio of the exhaust gases from 13:1 up to 16:1.

On the other hand, the solid lines in FIG. 5 show the purification percentages of the exhaust gas components which were obtained by holding the electromagnetic valve 16 in the OFF (closed) position and gradually changing the air-fuel ratio of the mixtures produced in the carburetor 12 from 13:1 to 16:1. The purification curves shown by these solid lines practically correspond with the purification curves in FIG. 1.

A comparison between the solid and broken lines in FIG. 5 shows that a greater A/F window range could be obtained by supplying secondary air into the exhaust system while maintaining constant the air-fuel ratio of the mixture in the intake system.

Figure 6:
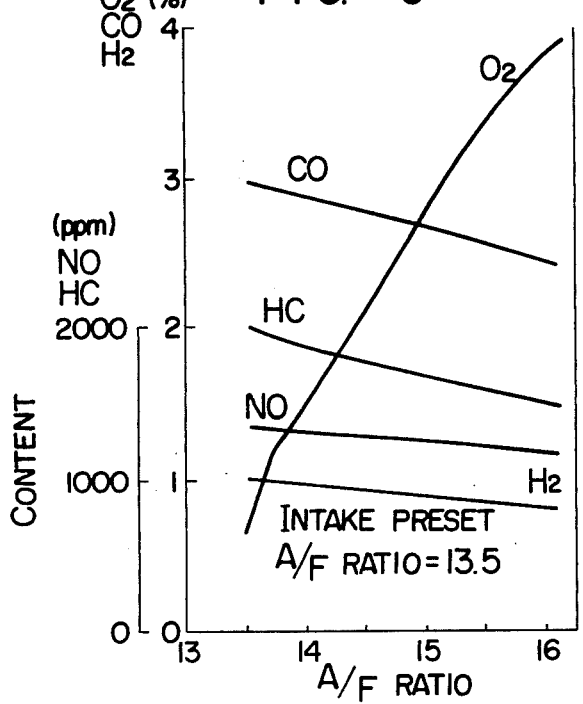
FIG. 6 is a graph showing the variations of the exhaust gas composition obtained by maintaining the air-fuel ratio of the mixture supplied to the engine at 13:1 and gradually supplying secondary air into the exhaust system thus varying the air-fuel ratio of the exhaust gases from 13:1 up to 16:1.

While, in such case, the resulting exhaust gas composition is dependent on the fixed air-fuel ratio of the mixture in the intake system, in the present case (the intake system mixture ratio=13:1) the resulting exhaust gas composition would be as shown in FIG. 6. A comparison between FIGS. 6 and 2 clearly shows that these exhaust gas composition diagrams differ greatly from each other.

The most important difference between the two composition diagrams is that when the air-fuel ratio of the mixture in the intake system is varied (FIG. 2), with the stoichiometric ratio as a threshold value, the CO, $O_2$ and $H_2$ contents vary greatly as mentioned previously and moreover the NO and HC contents also vary relatively greatly, whereas when secondary air is supplied into the exhaust system (FIG. 6), the composition determined on the intake side is only diluted with the secondary air with the result that the CO, $H_2$, NO and HC contents are caused to vary only very smoothly and the $O_2$ content alone varies greatly practically in linear relation with the variation of the air-fuel ratio.

Figure 7:
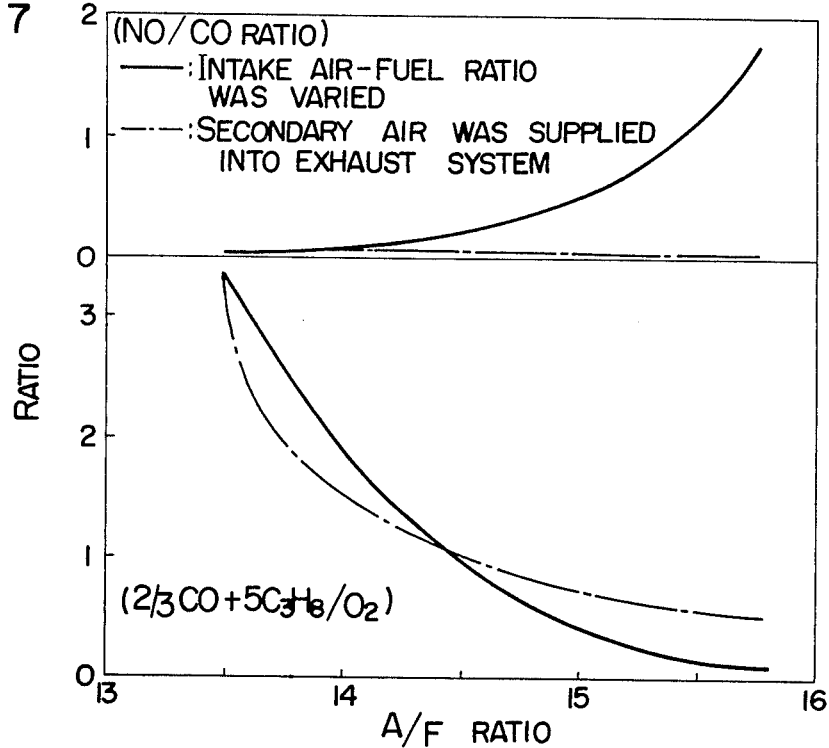
FIG. 7 is a graph showing the relationship between the variations of the air-fuel ratio and the exhaust gas component ratios which were obtained when the exhaust gas composition was varied as shown in FIGS. 2 and 6, respectively.

As regards the purifying capacity of the three-way catalyst by these two method of varying the air-fuel ratio, a greater effective area (the air-fuel ratio range where more than 80% of the three components of CO, HC and NO can be removed) can be ensured for the three-way catalyst when secondary air is supplied into the exhaust pipe as shown in FIG. 5, and the reason for this may be considered to reside in the difference between the resulting exhaust gas compositions. FIG. 7 shows the comparative component ratios, i.e., CO, $H_2$, HC/$O_2$ and NO/CO ratios which were typically obtained from the composition diagrams of FIGS. 2 and 6 in accordance with the reaction formulas (1) through (6). The differences in purification percentage shown in FIG. 5 can be explained on the basis of FIG. 7, as follows:

NO/CO ratio: Where the air-fuel ratio of the mixtures is varied in the intake system, as the air-fuel ratio becomes leaner, while the NO content increases, the content of CO or reducing agent of NO decreases thus impeding the reduction reaction of the reaction formula (4) with the resulting decrease in the purification percentage of NO. On the other hand, when the secondary air is supplied into the exhaust system, the NO/CO practically remains unchanged, thus maintaining the satisfactory conditions with respect to the equivalent ratio of NO/CO=1 and thereby proving the effectiveness of this method in reducing NO emissions on the lean side. Of course, the CO, $H_2$, HC/$O_2$ ratio that will be described later also has an effect on the effectiveness and there is a limiting value to the purification of NO on the lean side. (Because the purification of NO will be stopped if the reducing agents, such as, CO, $H_2$, HC, etc., are removed by reacting with $O_2$).

CO, $H_2$, HC/$O_2$ ratio: This represents the ratio of the $O_2$ content in the exhaust to the required $O_2$ content for completely oxidizing the CO, $H_2$ and HC contents in the exhaust for the reaction formulas (1), (2) and (3) with the HC in the exhaust being calculated in terms of $C_3H_8$ (propane) for the reaction formula (3), and the ratio of 1 corresponds to the equivalent amount. (However, this only represents a reference value, since the values of CO, $H_2$ and HC for reducing NO are neglected).

Assuming now that the ratio of less than 1 represents an incomplete oxidation condition where tthe amounts of substances to be oxidized are large and that the ratio of greater than 1 represents a complete oxidation condition where the amount of $O_2$ is large, as will be seen from FIG. 7, the curve representing the ratio obtained by varying the air-fuel ratio of the mixtures in the intake system and the curve representing the ratio obtained by varying the mixture ratio by means of secondary air in the exhaust system cross each other at around the air-fuel ratio of 14.5:1 where the ratio is 1, and at the air-fuel ratios on both sides of this ratio the curves part from each other. This clearly explains the difference in purification percentage between the methods, namely, in the case of the former (where the air-fuel ratio is varied in the intake system) the amount of $O_2$ which is necessary for oxidation of CO and HC becomes absolutely short on the lean side, while on the rich side the amount of $O_2$ becomes absolutely superfluous with the result that complete oxidation of CO and HC is promoted and reduction reaction of NO is impeded, thus proving, along with the above-mentioned NO/CO graphs, that the purification conditions of NO are unsatisfactory on the lean side. On the contrary, in the case of the latter (where secondary air is supplied into the exhaust system), the resulting curve is very smooth thus showing that on the rich side the ratio is smaller than in the former case thus proving to be advantageous in oxidation of CO and HC, whereas on the lean side the ratio is greater than in the former case thus proving to be advantageous in reduction of NO owing to the absence of any heavy surplus of $O_2$ in addition to the NO/CO ratio.

In addition to the above, the exothermic reaction may be considered to be a cause of the differences of FIG. 5. The oxidation reactions of the reaction formulas (1) to (3) are exothermic reactions. Thus, considering the contents of CO, HC and $H_2$ or substances subjected to oxidation in these reactions, in the case of the former the contents rapidly decrease as the air-fuel ratio becomes leaner (see FIG. 2), while in the case of the latter the contents remain at certain levels (see FIG. 6) so that the heat of reaction on the catalyst surface is higher in the latter case and this appears to be effective in promoting the reactions on the catalyst.

As will be seen from the foregoing, the inventors made thorough investigations on the advantages and the causes thereof of the method of supplying secondary air into the engine exhaust system, and the following experiments were conducted on the basis of these investigations.

EXPERIMENT 2

Under the same conditions as the Experiment 1, the electromagnetic valve 16 was held in the ON position and the amount of secondary air supplied was fixed to maintain the air-fuel ratio of the mixture in the exhaust system at 16:1. In this condition, the electromagnetic valve 16 was repeatedly switched on and off thus causing the air-fuel ratio of the exhaust gases to repeatedly vary alternately between the rich side or 13:1 (OFF) and the lean side 16:1(ON). With the oscillation frequency of the oscillator 17 fixed at 1 Hz, the electromagnetic valve 16 was operated by varying the ratio of one time to off time (the ratio of the cycle of displacement to the rich side to the cycle of displacement to the lean side of the air-fuel ratio from ON/OFF=0 sec/1 sec through 0.5 sec/0.5 sec to 1 sec/0 sec, and the air-fuel ratio (average) of the exhaust gases at the inlet of the three-way catalyst 14 and the purification performance of the three-way catalyst 14 were measured. The results obtained are shown by the solid lines in FIG. 8. In the Figure, the ratio of on time to off time or ON/OFF ratio at the intersection of the purification curves of NO and CO or the point of the highest purification percentages of the three components was 0.45 sec/0.55 sec.

Figure 8:
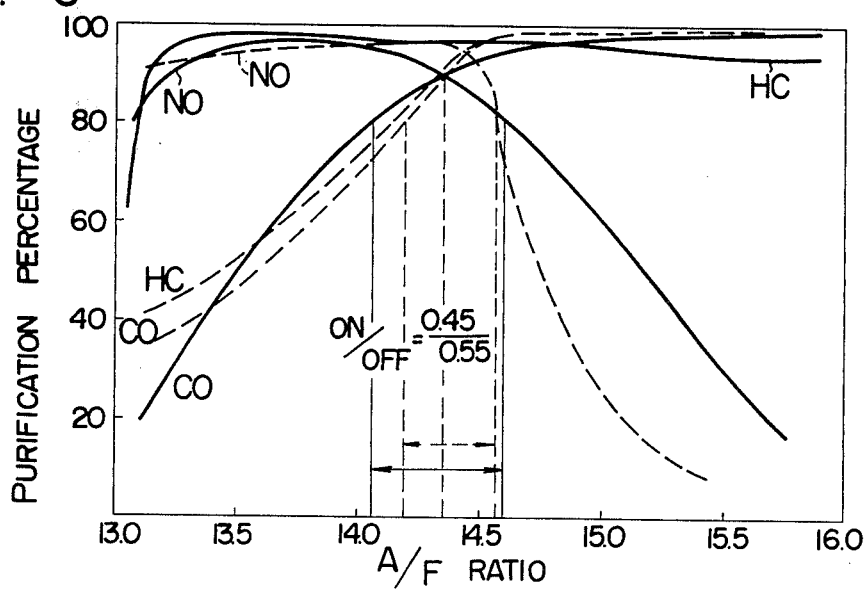
FIG. 8 is a graph showing the purification percentages of the exhaust gas components by a threeway catalyst containing an oxygen storage material, which were obtained by maintaining the air-fuel ratio of the mixture supplied to the engine at 13:1 and varying the average air-fuel ratio of the exhaust gases from 13:1 up to 16:1 by intermittently supplying secondary air into the exhaust system.

For purposes of comparison between the results of the Experiment 1 with those of the Experiment 2, the broken lines in FIG. 5 are shown as such by the broken lines in FIG. 8. It is needless to say that the broken lines in FIG. 8 represent the purification curves of the three components obtained by maintaining the air-fuel ratio of the mixture in the intake system at 13:1 and gradually varying the exhaust gas air-fuel ratio from 13 to 16:1 by gradually supplying secondary air into the exhaust system. On the other hand, the solid lines in FIG. 8 represent the purification curves of the three components which were obtained by maintaining the air-fuel ratio in the intake system at 13:1 and intermittently supplying secondary air into the exhaust system thus causing the exhaust gas air-fuel ratio to oscillate between 13:1 and 16:1 and thereby varying the average air-fuel ratio of the exhaust gases from 13:1 to 16:1.

As will be seen from a comparison between the two methods, the inventors have discovered that of these two methods of supplying secondary air, the method of intermittently supplying secondary air would be more effective in increasing the A/F window range than supplying secondary air gradually (continuously).

EXPERIMENT 3

The experiment was made in the same manner as the Experiment 2 by using, in place of the three-way catalyst of the Experiment 2, 2.5 l of a pellet type three-way catalyst carrying 1.5 g/l of a Pt-Rh catalytic metal and containing no oxygen storage material ($CeO_2$).

Figure 9:
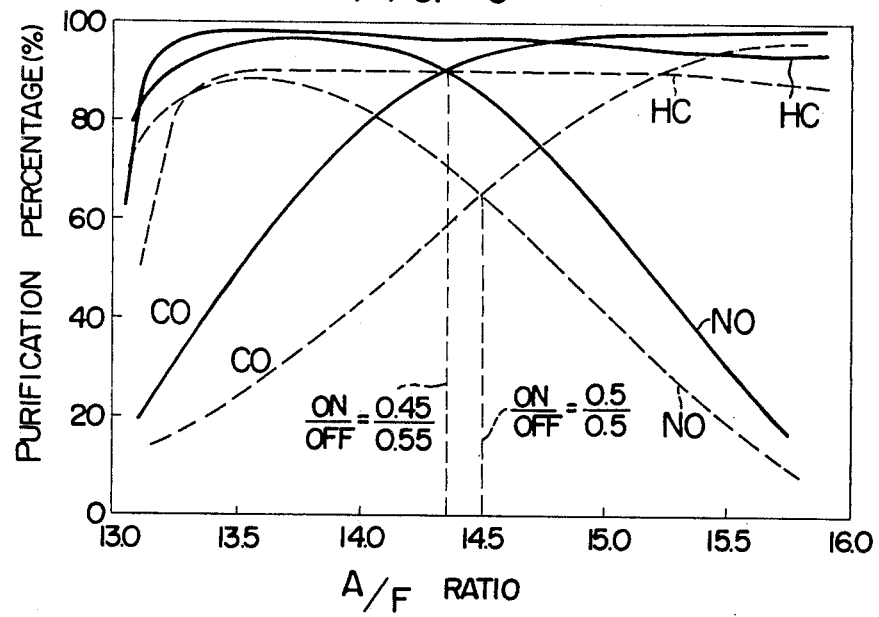
FIG. 9 is a graph showing the purification percentages of the exhaust gas components by a threeway catalyst containing no oxygen storage material, which were obtained by intermittently supplying secondary air into the exhaust system in the same manner as in the case of FIG. 8.

The results obtained are shown by the broken lines in FIG. 9. At the intersection of the NO and CO purification curves, the ratio of on time to off time of the electromagnetic valve was ON/OFF=0.5 sec/0.5 sec and the amount of displacement to the rich side was practically the same with that to the lean side. For purposes of comparison between the results of the Experiments 2 and 3, the solid lines in FIG. 8 are shown as such by the solid lines in FIG. 9.

As will be seen from the results of the Experiment 3 (the solid lines in FIG. 9), if a three-way catalyst containing no oxygen storage material is used with the method of intermittently supplying secondary air, there would be no air-fuel ratio at which the noxious components (CO, HC, NO) in the exhaust gases can be simultaneously removed with purification percentages of over 80%. Also, a comparison between the solid and broken lines in FIG. 9 shows that the three-way catalyst containing the oxygen storage material has a purifying efficiency far greater than that of the three-way catalyst containing no oxygen storage material.

With the Experiment 2 (the solid lines in FIG. 8), the ratio of on time to off time of the electromagnetic valve corresponding to the feed rate of secondary air that could ensure the purification of the noxious components in the exhaust gases with the maximum efficiency or the ratio at the intersection of the purification curves (the solid lines) in FIG. 8 was ON/OFF ratio=0.45/0.55. Thus, the following experiment was conducted to look into the cause of this result.

EXPERIMENT 4

Under the same conditions as the Experiments 2 and 3, the electromagnetic valves 16 was switched on and off, and the air-fuel ratios on the upstream and downstream sides of the three-way catalyst 14 were measured by the detectors 18 and 19 when the ON/OFF ratio of the electromagnetic valve 16 was 0.5/0.5 and 0.45/0.55, respectively. The resulting output waveforms of the detectors 18 and 19 are respectively shown in FIGS. 10A and 10B.

In the Figures, the abscissa represents the time and the ordinate represents the detector output (voltage). The solid line a indicates the output waveform of the detector 18 at the inlet (upstream side) of the three-way catalyst, the broken line b indicates the output waveform of the detector 19 at the outlet (downstream side) of the three-way catalyst containing no oxygen storage material, and the dot-and-dash line c indicates the output waveform of the detector 19 at the outlet of the three-way catalyst containing the oxygen storage material ($CeO_2$).

Figures 10A, 10B:
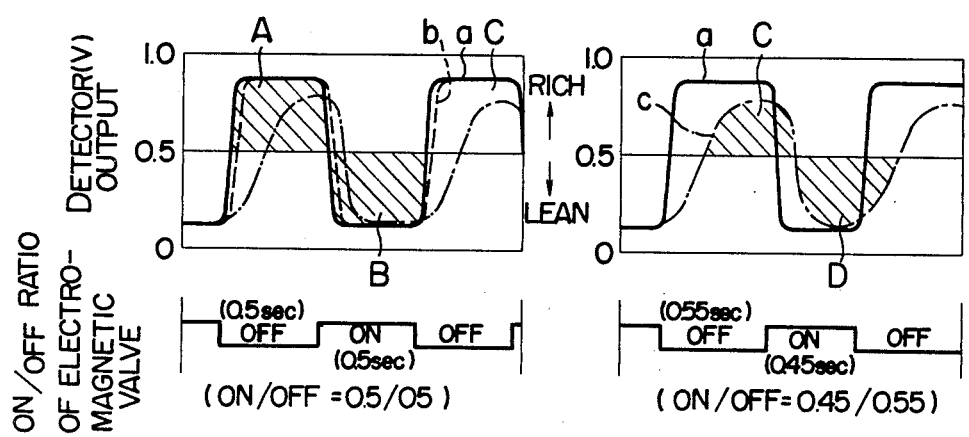
FIGS. 10A and 10B are waveform diagrams respectively showing the output of the air-fuel ratio detectors disposed respectively at the inlet and outlet of the three-way catalyst.

As will be seen from FIGS. 10A and 10B, the air-fuel ratio at the inlet of the three-way catalyst varies in response to the ON-OFF (feeding-nonfeeding) of secondary air, and the amount of displacement of the air-fuel ratio to the rich side (the area indicated by the hatched portion A in FIG. 10A) becomes equal to that to the lean side (the area indicated by the hatched portion B in FIG. 10A).

The air-fuel ratio at the outlet of the three-way catalyst containing no oxygen storage material varies (as shown by the broken line b in the Figure) practically in response to the variation (the solid line a) of the air-fuel ratio at the inlet of the three-way catalyst with a certain time delay.

On the other hand, the air-fuel ratio at the outlet of the three-way catalyst containing the oxygen storage material varies as indicated by the dot-and-dash line c in the Figure, and this variation considerably differs from the variation (the solid line a) of the air-fuel ratio at the catalyst inlet. It will readily be understood that this variation is brought about by virtue of the oxygen storage and discharge operations of the oxygen storage material.

A further examination of this air-fuel ratio variation (the dot-and-dash line c) shows that in FIG. 10A, the time interval from the instant at which the air-fuel ratio at the inlet of the three-way catalyst changes from the rich to the lean side (the instant at which the detector output changes from the high to the low level with 0.5 V as a threshold value) until the air-fuel ratio at the outlet of the catalyst changes from the rich to the lean side (hereinafter referred to as a rich-lean switching rate) is shorter than the time interval from the instant at which the air-fuel ratio at the inlet of the three-way catalyst changes from the lean to the rich side until the air-fuel ratio at the outlet of the catalyst changes from the lean to the rich side (hereinafter referred to as a lean-rich switching rate). In other words, the rich-lean switching rate is faster than the lean-rich switching rate. This means that the rate at which oxygen is stored in the oxygen storage material ($CeO_2$) is not the same with the rate at which the material discharges the stored oxygen.

By virtue of the fact that the storage and discharge rates of the oxygen storage material are not the same (the storage rate is higher than the discharge rate), if the ON/OFF ratio of the electromagnetic valve is selected 0.5/0.5, then it may be presumed that the amount of oxygen discharged from the oxygen storage material in response to the change of the air-fuel ratio to the rich side is less than that stored by the oxygen storage material in response to the changing of the air-fuel ratio to the lean side, thus adjusting the exhaust gas atmosphere in the vicinity of the three-way catalyst to the lean side. Also, it will be seen from the variation of the air-fuel ratio at the outlet of the three-way catalyst containing the oxygen storage material shown in FIG. 10A, the fact that at the outlet the amount of displacement of the air-fuel ratio to the rich side (the area defined by the dot-and-dash line c on the rich side) is smaller than that to the lean side (the area defined by the dot-and-dash line c on the lean side). Thus, even if the average air-fuel ratio of the exhaust gases supplied to the three-way catalyst is adjusted to the stoichiometric ratio, the exhaust gas atmosphere in the vicinity of the three-way catalyst will be adjusted to the lean side by the action of the oxygen storage material.

Thus, in an attempt to adjust the atmosphere around the three-way catalyst to the stoichiometric air-fuel ratio, the ON/OFF ratio of the electromagnetic valve 16 was controlled at 0.45/0.55 thus obtaining the results shown in FIG. 10B. This resulted in that at the outlet of the three-way catalyst the amount of displacement to the rich side (the area C) was made equal to that to the lean side (the area D) as indicated by the hatched portions C and D in FIG. 10B. Thus, by adjusting the ON/OFF ratio of the electromagnetic valve to 0.45/0.55, it was made possible to make the oxygen storage quantity almost equal to the discharge quantity and thereby to adjust the atmosphere around the three-way catalyst to the stoichiometric ratio.

EXPERIMENT 5

Figure 11:
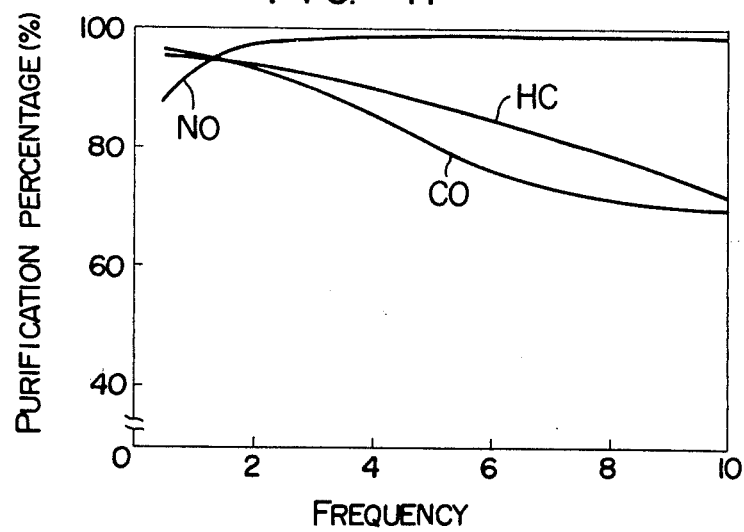
FIG. 11 is a graph showing the effect on the purification percentages of the exhaust gas components of the variation in the frequency of intermittent secondary air supply.

By using the ON/OFF ratio=0.45/0.55 of the electromagnetic valve obtained by the above-mentioned Experiment 4, the frequency of the ON-OFF operations of the electromagnetic valve was varied and the resulting purification percentages of the exhaust gas components were measured. In other words, under the same conditions as the Experiment 2, the ON/OFF ratio of the electromagnetic valve 16 was maintained constant at 0.45/0.55 but the frequency of the ON-OFF operations of the electromagnetic valve 16 was varied from 0.5 to 10 Hz, and the resulting purification percentages of the exhaust components were measured. FIG. 11 shows the results of the measurements.

As will be seen from FIG. 11, as the frequency becomes higher than 5 Hz, the purification percentages of CO and HC, particularly the purification percentage of CO decreases. In order to maintain the purification percentages of the components (NO, CO, HC) at 80% or over, the frequency must be set in the range of 0.5 to 5 Hz. Of course, this is dependent on the content of an oxygen storage material as will be seen from the following Experiment 6, and the conclusion is that the frequency of 0.5 to 5 Hz is adequate in this case (where 20 g/l of $CeO_2$ is used for the oxygen storage material).

EXPERIMENT 6

Figure 12:
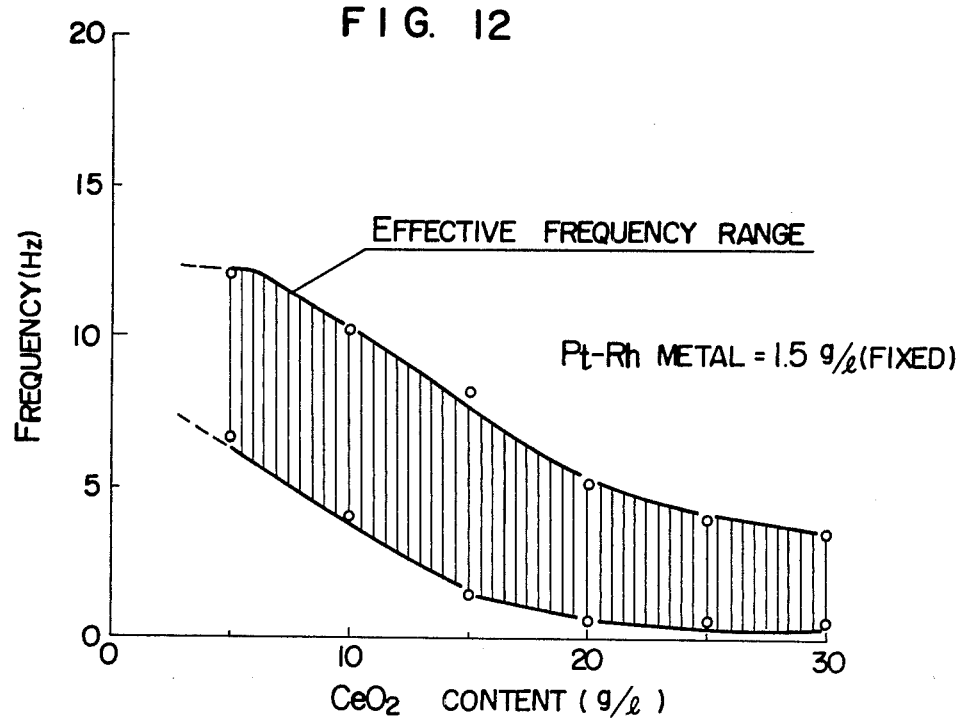
FIG. 12 is a graph showing the range of frequencies in which over 80% purification percentages of the exhaust gas components are obtainable with varying amounts of the oxygen storage material.

While, in the Experiment 5, the content of the oxygen storage material ($CeO_2$) was 20 g/l, it was of course self-evident that the amount of oxygen stored would be dependent on the magnitude of the content, and the sum of the oxygen storage time and the discharge time would also differ. Thus, this Experiment was carried out in the same manner and under the same conditions as the Experiment 5 but varying the content of the oxygen storage material ($CeO_2$) from 5 g/l to 30 g/l. The results obtained were plotted in the similar manner as FIG. 11, and obtained from the resulting graphs is FIG. 12 which shows the relationship between the content of the oxygen storage material and the frequency range which ensures purification of the exhaust gas components by more than 80%.

Although qualitative in nature, from the Experiments 5 and 6 it was confirmed that as the content of the oxygen storage material is increased, the frequency range of the ON-OFF operations of the electromagnetic valve which ensures purification of the exhaust gas components with high percentages (over 80%) is shifted in the direction which decreases the frequency.

Next, the following Experiment 7 was carried out to make investigation into the relationship between the frequency and the catalyst bed.

EXPERIMENT 7

Using a three-way catalyst having a pair of circular monlithic catalyst beds arranged in series with each other and each consisting of a material known as Cojelite, coated with $\gamma$-$Al_2O_3$ by the known method and carrying 0.75 g of Pt-Rh as well as 5 g of $CeO_2$ (Pt-Rh=1.5 g/l and $CeO_2$=10 g/l) and selecting the ON/OFF ratio 0.45/0.55, the oscillation frequency was held at 15 Hz and the resulting purification percentages of the three components were measured. Simultaneously, in the Experiment 6, the similar tests were conducted on the three-way catalyst containing 10 g/l of $CeO_2$ and the resulting purification percentages were measured. The following values were obtained from these test results.

| Type of catalyst bed | Purification percentage (%) of exhaust gas components | | |
|---|---|---|---|
| | NO | CO | HC |
| Monolithic type | 92.4 | 96.0 | 98.0 |
| Pellet type | 98.5 | 70.0 | 72.5 |

As will be seen from these results, when used in the high frequency range (e.g., over 10 Hz), the purification percentages of CO and HC deteriorate and the atmosphere on the catalyst deviates to the rich side in the case of the pellet type catalyst. Thus, when used in the high frequency range, the monolithic type catalyst bed may be said more desirable than the pellet type catalyst bed.

EXPERIMENT 8

Figure 13:
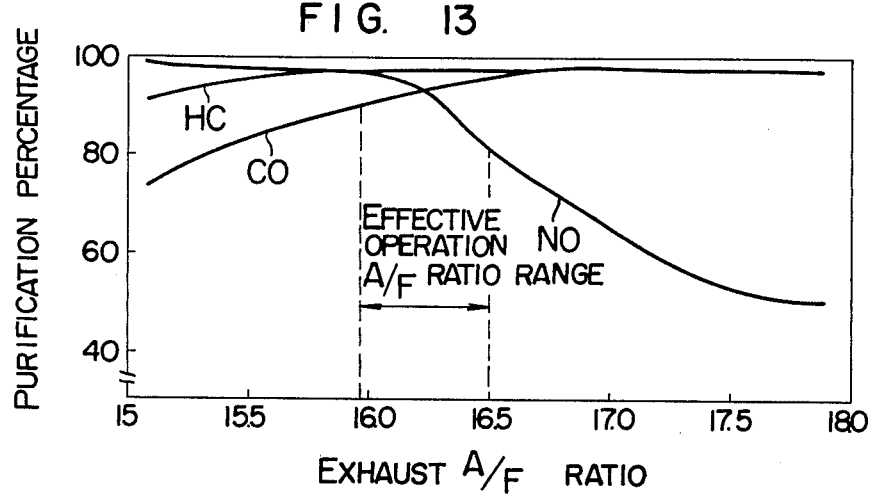
FIG. 13 is a graph showing the effect on the purification percentages of the exhaust gas components of the variation in the air-fuel ratio on the exhaust side.

Under the same conditions as the Experiment 1, with the electromagnetic valve 16 held in the ON position the amount of secondary air supplied was maintained at a constant value so that the air-fuel ratio on the exhaust side was maintained at 15:1. With the amount of secondary air supply maintained constant, the secondary air was intermittently supplied by repeatedly switching on and off the electromagnetic valve 16 at a frequency of 1 Hz with the ON/OFF ratio=0.45/0.55. In this way, the air-fuel ratio of the exhaust gases was varied in the range between 13:1 and 16:1, and the resulting purification percentages of the exhaust gas components were measured. Similarly, the amount of secondary air supply was varied so that the exhaust side air-fuel ratio was maintained at 15.5:1, 16.0:1, 16.5:1, ..., 18.0:1, respectively, thus varying the exhaust gas air-fuel ratio correspondingly and the resulting purification percentages of the exhaust gas components were measured. The results obtained are shown in FIG. 13. In the Figure, designated as the effective operation air-fuel ratio range represents the exhaust side air-fuel ratio range in which the purification percentages of the exhaust gas components were NO=80% or over and CO, HC=90% or over. In this experiment, this range corresponded practically to the range between 16.0:1 and 16.5:1.

EXPERIMENT 9

In the Experiment 8, the intake side air-fuel ratio was held at 13:1 and the resulting effective operation air-fuel ratio range was measured. In this Experiment, the intake side air-fuel ratio was maintained successively at 13:1 through 14:1, and the effective operation air-fuel ratio ranges corresponding to the respective intake side air-fuel ratios were measured in the similar manner as the Experiment 8. The results of this experiment are shown by the hatched portion a in FIG. 14.

EXPERIMENT 10

Figure 14:
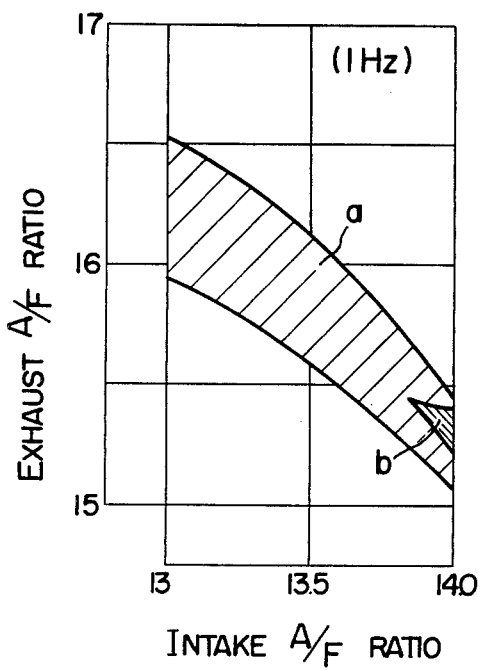
FIGS. 14 and 15 are graphs showing the relationship between the air-fuel ratio on the intake side and the effective operation air-fuel ratio range of the air-fuel ratio on the exhaust side.

While, in the Experiment 9, the effective operation air-fuel ratio range of the three-way catalyst containing the oxygen storage material was measured, in this experiment the similar tests were conducted on the three-way catalyst containing no oxygen storage material with the ON/OFF ratio of the electromagnetic valve held at 0.5/0.5, and the measurement results are shown by the hatched portion b in FIG. 14.

EXPERIMENT 11

Figure 15:
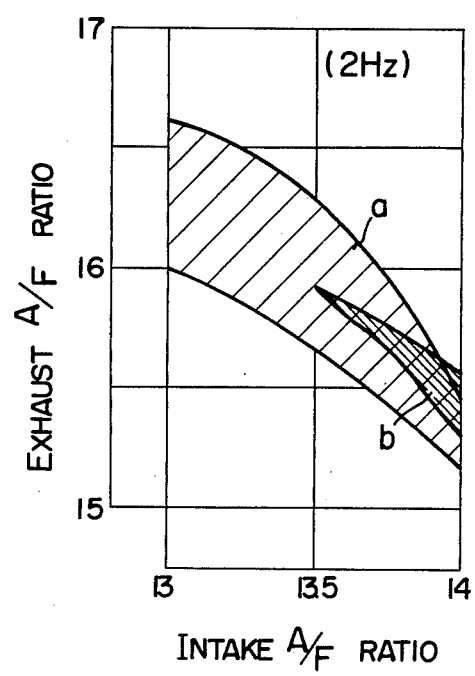

While, in the Experiments 9 and 10, the measurements were made by holding the ON-OFF frequency of the electromagnetic valve 16 at 1 Hz, in this Experiment the frequency was held at 2 Hz and the resulting effective operation air-fuel ratio range was measured in the same way as the Experiments 9 and 10. The results obtained are shown in FIG. 15. In the Figure, the hatched portion a indicates the effective operation air-fuel ratio range of the three-way catalyst containing the oxygen storage material, and the hatched portion b indicates the effective operation air-fuel ratio range of the three-way catalyst containing no oxygen storage material.

As will be seen from FIGS. 13 through 15, practically there exists no effective operation air-fuel ratio range for the three-way catalyst containing no oxygen storage material. On the other hand, with the three-way catalyst containing the oxygen storage material, a satisfactory effective operation air-fuel ratio range exists with the intake side air-fuel ratio in the range 13:1 to 14:1. Accordingly, in the case of the actual engine mounted on a vehicle, even if the intake side air-fuel ratio is caused to vary, the three-way catalyst operating method of this invention is capable of operating satisfactorily the three-way catalyst with high purification percentages. Thus, apparatus for performing the method of operating a three-way catalyst in accordance with this invention will now be described with reference to the illustrated embodiments.

Figure 16:
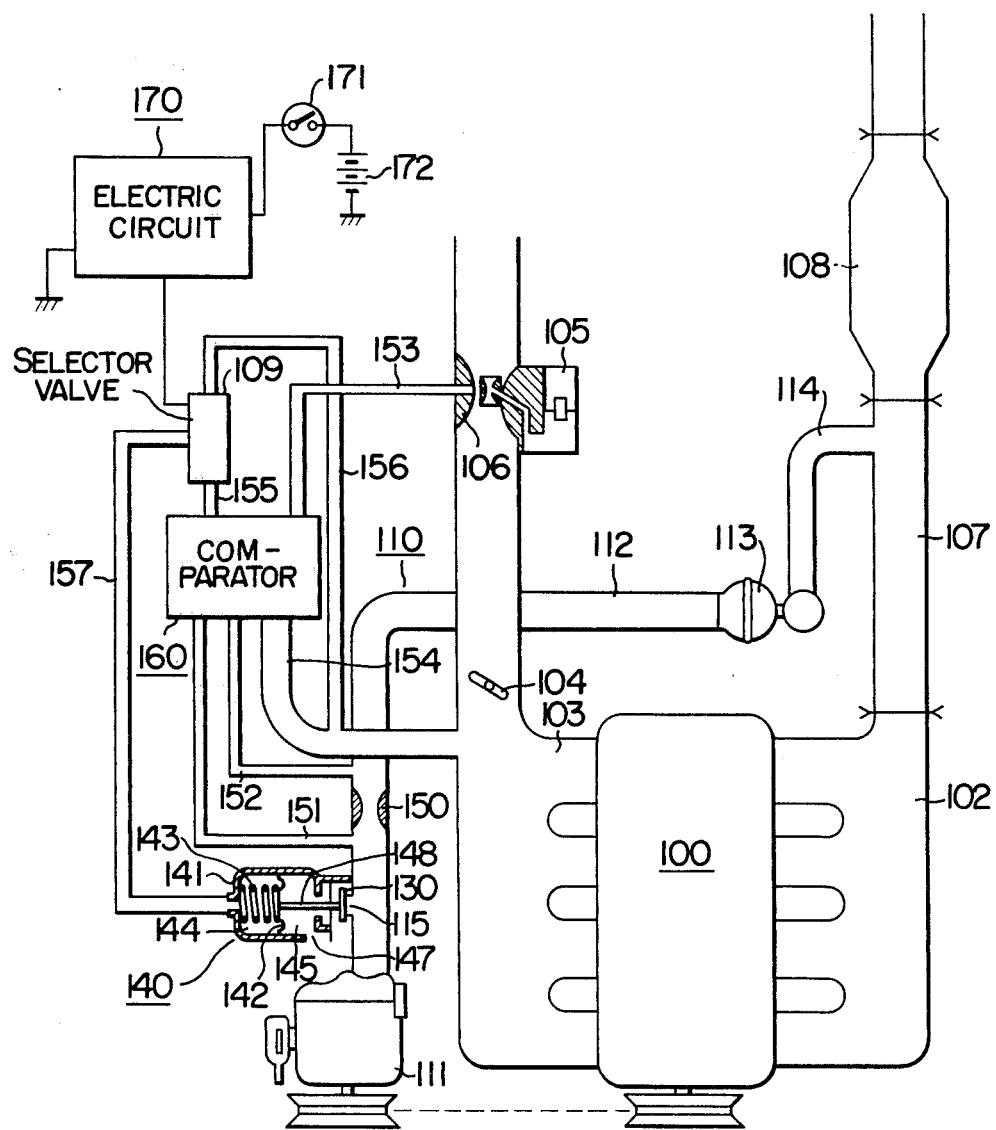
FIG. 16 is a schematic diagram showing the general construction of a first embodiment of an apparatus for performing the method of operating an internal combustion engine three-way catalyst according to the invention.
Figure 17:
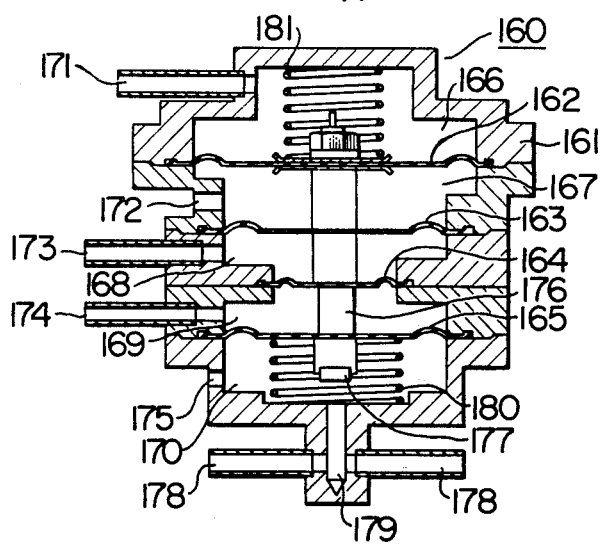
FIG. 17 is an enlarged sectional view showing in detail the comparator 160 shown in FIG. 16.
Figure 18:
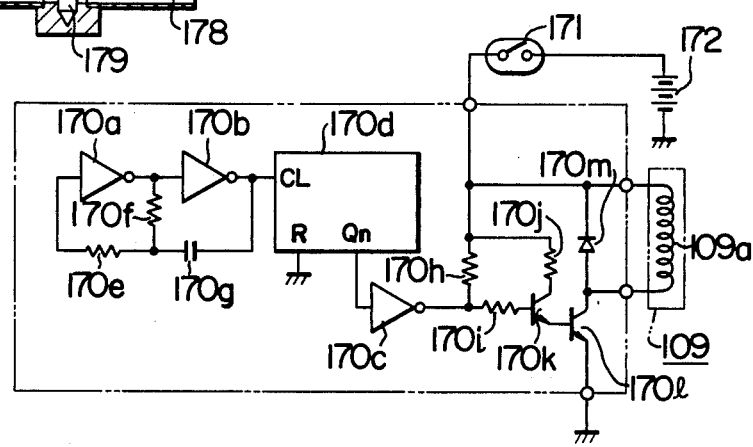
FIG. 18 is a detailed circuit diagram of the electric circuit shown in FIG. 16.

In the first embodiment illustrated in FIGS. 16 through 18, an internal combustion engine 100 is equipped with an exhaust manifold 102 and an intake manifold 103. A throttle valve 104 is mounted upstream of the intake manifold 103. Also provided upstream of the throttle valve 104 are a carburetor 105 and a venturi 106. An exhaust pipe 107 is connected to the downstream end of the exhaust manifold 102, and mounted in the exhaust pipe 107 is Pt-Rh three-way catalyst 108 containing an oxygen storage material, such as $CeO_2$. The carburetor 105 is adjusted so that the air-fuel ratio of the mixture supplied to the engine 100 is maintained constant and smaller (e.g., 13:1) than the stoichiometric air-fuel ratio throughout the range of operating conditions of the engine 100 or the control range of the purifying system.

A secondary air supply unit 110 comprises an air pump 111, a secondary air supply pipe 112, a check valve 113 and a secondary air injection nozzle 114. The air pump 111 is connected with a belt to the engine 100 so as to be driven by the latter. The secondary air supply pipe 112 has its one end connected to the outlet of the air pump 111 which is not shown and its other end connected to the injection nozzle 114 through the check valve 113. The injection nozzle 114 is opened into the exhaust pipe 107 just before the inlet of the three-way catalyst 108. The secondary air supply pipe 112 and the injection nozzle 114 constitute an air passage for supplying the air from the air pump 111 into the exhaust pipe 107. The secondary air supply pipe 112 is provided with an air escape passage 115 so that the ratio of the passage area of the secondary air supply pipe 112 to the area of the air escape passage 115 is controlled by a poppet-type control valve 130 adapted to be operated by an actuator 140. The control valve 130 is mounted upstream of the check valve 113.

The apparatus further comprises a comparator 160 for generating a first control signal in response to a signal indicative of the amount of intake air and another signal indicative of the amount of secondary air, a selector valve 109 comprising, for example, an electromagnetic three-way valve for passing either the first control signal or a second control signal, and an electric circuit 170 for periodically operating the selector valve 109, whereby the actuator 140 is operated by either the first control signal or the second control signal. In this embodiment, the pressure difference across an orifice or restrictor 150 (the difference between the front and back pressures) which is formed downstream of the escape passage 115 in the secondary air supply pipe 112, is used as the signal indicative of the secondary air quantity. The pressures at the front and back of the orifice 150 are respectively directed to the comparator 160 through first and second pressure pipes 151 and 152. On the other hand, the venturi vacuum produced at the venturi 106 is used as the signal indicative of the intake air quantity, and the venturi vacuum is directed to the comparator 160 through a third pressure pipe 153. The intake vacuum produced downstream of the throttle valve 104 is used as the pressure source of the first control signal, and the vacuum is directed by way of a fourth pressure pipe 154 to the comparator 160 which in turn controls the value of the intake vacuum and applies it as the first control signal to the selector valve 109 by way of a fifth pressure pipe 155. Also the intake vacuum itself is used as the second control signal and it is applied to the selector valve 109 through a sixth pressure pipe 156 branched off the fourth pressure pipe 154. In response to the command from the electric circuit 170, the selector valve 109 selectively passes the first and second control signals, and one or the other of the control signals is applied to the actuator 140 through a seventh pressure pipe 157.

The actuator 140 includes two pressure chambers 144 and 145 which are defined by a housing 141 and a diaphragm 142 provided in the housing 141. In the Figure, the first control signal or the second control signal selected by the selector valve 109 is directed to the first pressure chamber 144 on the left side through the seventh pressure pipe 157, and the air is introduced into the second pressure chamber 145 through an atmospheric air inlet 147. Numeral 148 designates a shaft having its one end connected to the diaphragm 142 and its other end connected to the control valve 130. A spring 143 is mounted in the first pressure chamber 14 so as to press the diaphragm 142 to the right in the Figure. The biasing force of the spring 143 is so preset that when the second control signal is introduced into the first pressure chamber 144, the escape passage 115 is fully opened even if the second control signal is a low vacuum produced under the high load operation.

With the actuator 140 and the control valve 130 constructed as described above, when the vacuum (first control signal) is introduced into the first pressure chamber 144, a force acts on the diaphragm 142 which pulls it to the left in the Figure and the spring 143 also acts an opposing force on the diaphragm 142, thus determining the amount of lift of the control valve 130 in accordance with the balance of the two forces. When the second control signal is introduced into the first pressure chamber 144, as mentioned previously, the air escape passage 115 is fully opened so that no secondary air is injected into the exhaust pipe 107 since the injection nozzle 114 is opened into the normally positive pressure position. On the other hand, when the first control signal is introduced into the first pressure chamber 144, if the pulling force by the first control signal is greater than the opposing force of the spring 143, the area of the escape passage 115 is increased to impede the flow of secondary air, whereas when the biasing force of the spring 143 is greater than the pulling force, the area of the escape passage 115 is decreased by the control valve 130 to facilitate the flow of secondary air.

The construction and operation of the comparator 160 used in the present embodiment will now be described with reference to FIG. 17. Five pressure chambers 166, 167, 168, 169 and 170 are defined by a housing 161 and four diaphragms 162, 163, 164 and 165 which are mounted in the housing 161. The venturi vacuum is introduced through a first pipe 171 and the third pressure pipe 153 shown in FIG. 16 into the first pressure chamber 166 defined by the housing 161 and the first diaphragm 162. The atmospheric pressure is introduced through a first atmospheric air inlet 172 into the second pressure chamber 167 defined by the housing 161 and the first and second diaphragms 162 and 163. The pressure developed immediately behind the orifice 150 is introduced through a second pipe 173 and the second pressure pipe 152 shown in FIG. 16 into the third pressure chamber 168 defined by the housing 161 and the second and third diaphragms 163 and 164. The pressure just before the orifice 150 is introduced through a third pipe 174 and the first pressure pipe 151 shown in FIG. 16 into the fourth pressure chamber 169 defined by the housing 161 and the third and fourth diaphragms 164 and 165. In this case, the pressure introduced into the fourth pressure chamber 169 is greater than the pressure introduced into the third pressure chamber 168 by virtue of the action of the orifice 150. These pressures are all positive pressures. The atmospheric pressure is introduced through a second atmospheric air inlet 175 into the fifth pressure chamber 170 defined by the housing 161 and the fourth diaphragm 165. The four diaphragms 162, 163, 164 and 165 are connected with one another by a shaft 176. A valve seat member 177 is attached to one end of the shaft 176, and this valve seat member 177 opens and closes a communication port 179 which communicates the fifth pressure chamber 170 with a fourth pipe 178. One end of the fourth pipe 178 is connected to the fourth pipe 154 shown in FIG. 16 to introduce thereinto the intake vacuum downstream of the throttle valve 104. The other end of the fourth pipe 178 is connected to the fifth pressure pipe 155 shown in FIG. 16 to apply thereto the first control signal controlled by the comparator 160. Numerals 180 and 181 designate first and second springs adapted to determine the position of the valve seat member 177. The third diaphragm 164 has a pressure receiving area smaller than those of the other diaphragms 162, 163 and 165.

With the comparator 160 described above, the first diaphragm 162 is pulled upwards in the Figure by the venturi vacuum introduced into the first pressure chamber 166. On the other hand, the second diaphragm 163 is pressured upward in the Figure by the pressure (positive pressure) introduced into the third pressure chamber 168, and the fourth diagram 165 is pressed downward in the Figure by the pressure (positive pressure) introduced into the fourth pressure chamber 169. The third diaphragm 164 is pressed upward in the Figure by a slight force in response to the difference in pressure between the third and fourth pressure chambers 168 and 169. Considering the forces acting on the second, third and fourth diaphragms 163, 164 and 165 on the whole, the downwardly pressing force in the Figure is greater by virtue of the pressure difference between the third and fourth pressure chambers 168 and 169. For purposes of discussion, this resultant force will hereinafter be referred to as a resultant force W. The shaft 176 and the valve seat member 177 are moved in response to the difference between the resultant force W and the upwardly pulling force due to the venturi vacuum. Assuming that the two forces are balanced under the illustrated conditions, if the intake air quantity is increased with the resulting increase in the venturi vacuum introduced into the first pressure chamber 166, the shaft 176 and the valve seat member 177 are moved upward in the Figure so that the atmospheric air flowing into the fourth pipe 178 through the communicating port 179 is increased and the vacuum value of the first control signal passed through the fourth pipe 178 is decreased. On the contrary, when the venturi vacuum is decreased, the valve seat member 177 is moved downward in the Figure so that the atmospheric air flowing into the fourth pipe 178 is decreased or completely cut off and the vacuum value of the first control signal passed through the fourth pipe 178 is increased as compared with that just before this time. On the other hand, when the amount of secondary air is increased, causing the difference between the pressures before and behind the orifice 150 introduced into the third and fourth pressure chambers 168 and 169 to be excessively large, the shaft 176 and the valve seat member 177 are moved downward in the Figure. The atmospheric air flowing into the fourth pipe 178 is thereby decreased or completely cut off and the vacuum value of the first control signal passed through the fourth pipe 178 is increased as compared with that just before this time. On the contrary, when the difference between the pressures before and behind the orifice 150 introduced into the third and fourth pressure chambers 168 and 169 becomes excessively small, the valve seat member 177 is moved upward in the Figure, so that the amount of the atmospheric air flowing into the fourth pipe 178 is increased and the vacuum value of the first control signal passed through the fourth pipe 178 is decreased.

With the construction described above, the air drawn into the engine 100 in an amount determined by the opening of the throttle valve 104 is mixed with the fuel in the carburetor 105, and the mixture is supplied to and burned in the engine 100 whose exhaust gases are directed to the three-way catalyst 108 through the exhaust manifold 102 and the exhaust pipe 107.

Figure 19:
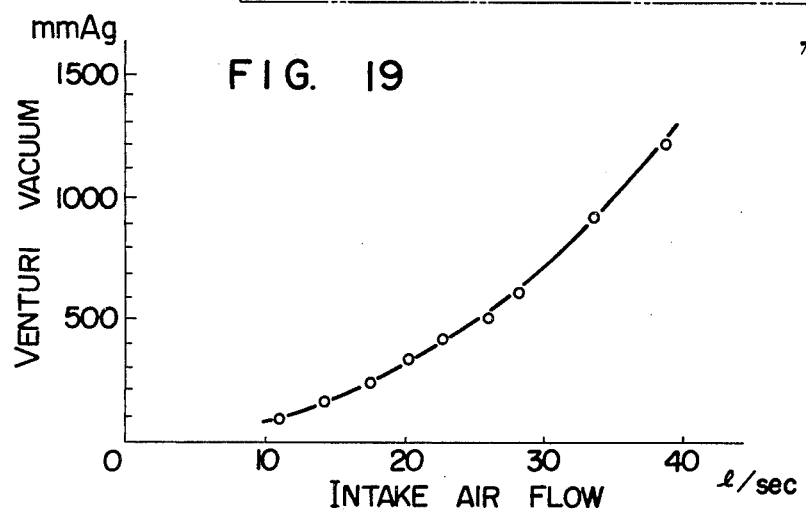
FIG. 19 is a characteristic diagram showing the relationship between the venturi vacuum and the intake air quantity.

In this case, as will be seen from FIG. 19, a venturi vacuum is produced at the venturi 106 of the carburetor 105 which is related to the amount of air drawn into the engine 100 ($Q = C_1 A_1 \sqrt{\Delta P}$; Q=intake air quantity, $A_1$=passage area of venturi 106, $\Delta P$=absolute value of venturi vacuum, $C_1$=coefficient of discharge).

On the other hand, when the first control signal is introduced into the first pressure chamber 144 of the actuator 140, secondary air is fed under pressure from the air pump 111 of the secondary air supply unit 110. Supply unit 110 is driven by the engine 100 so that the check valve 113 is opened by this secondary air through the supply pipe 112. The secondary air is directed to the injection nozzle 114 which in turn injects the air into the exhaust pipe 107 of the engine 100.

In this case, the pressure difference across the orifice 150 formed in the supply pipe 112 has a value related to the amount of secondary air supplied ($q = C_2 A_2 \sqrt{\Delta P'}$; q=amount of secondary air supplied, $A_2$=passage area of orifice 150, $\Delta P'$=value of pressure difference across orifice 150, $C_2$=coefficient of discharge).

The intake vacuum value is controlled by the comparator 160 which compares the venturi vacuum of the engine 100 with the differential pressure value across the orifice 150. The secondary air control valve 130 is operated by the actuator 140 in accordance with the pressure value of the thus controlled first control signal to control the area of the escape passage 115 in the secondary air supply pipe 112. The pressure difference across the orifice 150 is thus made proportional to the absolute value of the venturi vacuum. In other word, if the passage area is controlled so that $\Delta P = K_1 \Delta P'$ (where $K_1$ is the proportionality constant), then we obtain $Q = qK_2$ (where $K_2$ is the proportionality constant). The secondary air quantity proportional to the intake air quantity.

Next, the operation of this embodiment will be described. The operation relates to the case in which the first control signal is introduced into the first pressure chamber 144 of the actuator 140. It is assumed that in the conditions shown in FIG. 16, the signal representing the intake air quantity is proportional to the signal representing the secondary air quantity. In this condition, when the amount of intake air is increased so that the venturi vacuum is increased, by virtue of the previously mentioned operation of the comparator 160. The vacuum value of the first control signal introduced into the first pressure chamber 144 of the actuator 140 is decreased and the secondary air control valve 130 is moved in a direction which closes it. The area of the escape passage 115 is thus decreased increasing the amount of the secondary air flowing into the exhaust pipe 107 through the secondary air supply pipe 112, the check valve 113 and the injection nozzle 114. Conversely, when the amount of intake air is decreased so that the venturi vacuum is also decreased, in response to the previously mentioned operation of the comparator 160, the vacuum value of the first control signal introduced into the first pressure chamber 144 of the actuator 140 is increased. Consequently the secondary air control valve 130 is moved in a direction which opens it, thus decreasing the amount of the secondary air flowing into the exhaust pipe 107. On the other hand, when the amount of secondary air is increased so that the pressure difference across the orifice 150 becomes excessively large, by virtue of the previously mentioned operation of the comparator 160, the vacuum value of the first control signal introduced into the first pressure chamber 144 of the actuator 140 is increased and the secondary air control valve 130 is moved in the direction to open it. The area of the escape passage 115 is thus increased, decreasing the amount of the secondary air flowing into the exhaust pipe 107. Conversely, when the secondary air quantity is decreased so that the differential pressure value across the orifice 150 becomes excessively small, the vacuum value of the first control signal introduced into the first pressure chamber 144 is decreased and the secondary air control valve 130 is moved in the direction to close it, thus increasing the amount of the secondary air flowing into the exhaust pipe 107.

By thus controlling the secondary air control valve 130 so that the signal indicative of the secondary air quantity is made proportional to the signal indicative of the intake air quantity, it is possible to make the secondary air quantity proportional to the intake air quantity during the time period in which the first control signal is introduced into the first pressure chamber 144 of the actuator 140.

Next, the electric circuit 170 shown in FIG. 18 will be described. The electric circuit 170 comprises an oscillator circuit including inverters 170a and 170b, resistors 170e and 170f and a capacitor 170g, a frequency divider circuit including a binary counter 170d and an inverter 170c, and a power circuit including resistors 170h, 170i and 170j, transistors 170k and 170l and a diode 170m. Numeral 109a designates the coil of the selector valve 109, 171 a key switch, and 172 a battery. With the construction described, the output signals of the oscillator circuit are subjected to frequency division in the frequency divider circuit which in turn generates signals of a fixed frequency desired by the system. The resulting divided signals are applied to the power circuit through the inverter 170c so that the current flow to the coil 109a are switched on and off at the fixed frequency and the selector valve 109 is operated at the fixed frequency. In this embodiment, the ON/OFF ratio of the selector valve 109 is preset at 1:1.

Next, the operation of the system on the whole will be described. The electric circuit 170 operates the selector valve 109 at the fixed frequency so that the selector valve 109 alternately communicates the fifth pressure pipe 155 with the seventh pressure pipe 157 and the sixth pressure pipe 156 with the seventh pressure pipe 157. Consequently the first and second control signals are alternately applied to the first pressure chamber 144 of the actuator 140.

When the second control signal is introduced into the first pressure chamber 144 of the actuator 140, the secondary air control valve 130 fully opens the escape passage 115 and the injection nozzle 114 no longer injects the secondary air into the exhaust pipe 107. Consequently, the exhaust gases flowing into the three-way catalyst 108 are produced by the burning of a mixture having the small air-fuel ratio determined by the carburetor 105, and the resulting exhaust gas air-fuel ratio is smaller than the stoichiometric ratio.

When the first control signal is introduced into the first pressure chamber 144 of the actuator 140, the secondary air control valve 130 controls the escape passage 115 in such a manner that the secondary air is supplied in an amount proportional to the intake air quantity. This secondary air quantity proportional to the intake air quantity is preset in such a way that the average exhaust gas air-fuel ratio of the exhaust gases produced by supplying secondary air and the exhaust gases produced by supplying no secondary air falls in the hatched area in FIG. 1.

It will thus be seen that since in this embodiment an amount of air proportional to the intake air quantity is intermittently supplied as secondary air into the exhaust pipe upstream of the three-way catalyst, even if the intake air quantity is varied in response to the operating conditions of the engine, the air-fuel ratio of the exhaust gases supplied to the three-way catalyst can be made to stably alternately between the rich and lean sides.

Next, the second embodiment shown in FIG. 20 will be described. In this embodiment, secondary air proportional to the intake air quantity is intermittently supplied and additional air is always supplied in an amount proportional to the intake air quantity into the exhaust pipe upstream of the three-way catalyst. In the FIG. 20, those component parts designated by the same reference numerals as in the first embodiment are the same or equivalent to the counterparts in the first embodiment. Thus, the second embodiment will be described with emphasis placed on the differences between the first and second embodiments.

Figure 20:
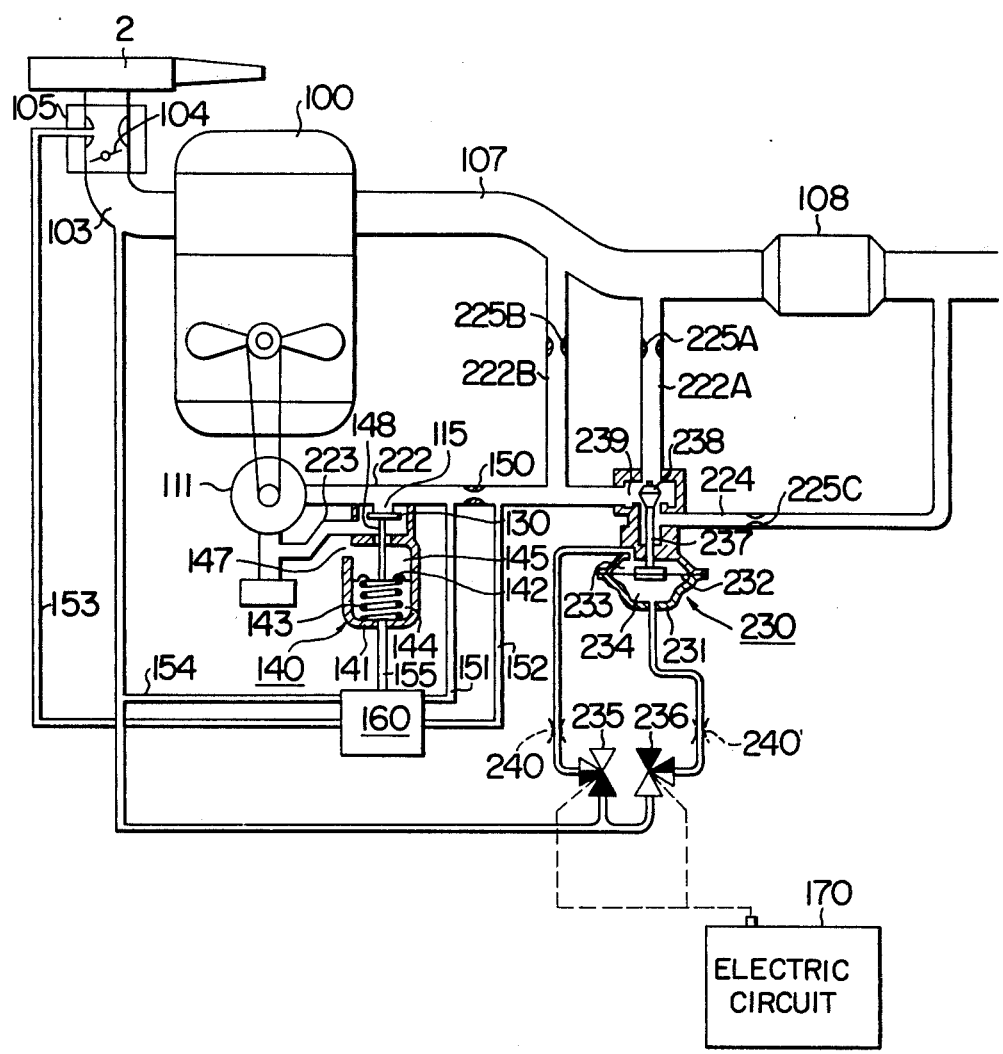
FIG. 20 is a schematic diagram showing the general construction of a second embodiment of the apparatus for performing the method of this invention.

In FIG. 20, numeral 222 designates a supply pipe line connected to an air pump 111. The amount of the air supplied from the air pump 111 and passed through an orifice 150 formed in the pipe line 222 is made proportional to the intake air quantity by an actuator 140 as in the first embodiment. Connected through the actuator 140 to the pipe line 222 is a relief passage 223 connected to the inlet side of the air pump 111. Also the pipe line 222 is connected to first and second secondary air supply pipe lines 222A and 222B. Secondary pipe lines 222A and 222B are opened into an exhaust pipe 107 upstream of a three-way catalyst 108 and a bypass passage 224 which is opened into the exhaust pipe 107 downstream of the three-way catalyst 108. The first supply pipe line 222A and the bypass passage 224 are alternately connected by a selector valve 230 to the pipe line 222. The pipe lines 222A and 222B and the passage 224 are respectively formed with orifices 225A, 225B and 225C for setting the flow rate. These orifices are preselected in this embodiment so that the orifices 225A and 225C are equal with each other and the flow rate of the orifice 225A is about four times that of the orifice 225B. Thus, an amount of secondary air proportional to the intake air quantity is always supplied through the second secondary air supply pipe line 222B into the exhaust pipe 107 upstream of the three-way catalyst 108 and thus the exhaust gas air-fuel ratio is adjusted slightly on the lean side as compared with the intake side air-fuel ratio. On the other hand, an amount of secondary air proportional to the intake air quantity is intermittently supplied from the first secondary air supply pipe line 222A through the selector valve 230. Consequently the exhaust gas air-fuel ratio is alternately varied to the rich and lean sides with the stoichiometric ratio as a threshold value. Also in the present embodiment, the intake side airfuel ratio (the mixture air-fuel ratio) is set at 13:1, while the amount of secondary air supplied from the second secondary air supply pipe line 222B is selected as 0.5/13 of the intake air quantity and the amount of secondary air supplied from the first secondary air supply pipe line 222A is selected as 2/13.0 of the intake air quantity. Consequently, the exhaust gas air-fuel ratio is adjusted to 13.5:1 by the secondary air supplied from the second supply pipe line 222B, and the exhaust gas air-fuel ratio is alternately varied between 13.5:1 and 15.5:1 by the secondary air supplied intermittently from the first supply pipe line 222A. In other words, the exhaust gas air-fuel ratio is varied alternately at equal intervals to the rich side (13.5:1) and the lean side (15.5:1) with the stoichiometric ratio (14.5:1) as a threshold value.

The selector valve 230 has two pressure chambers 233 and 234 which are defined by a diaphragm 232, and a rod 237 attached to the diaphragm 232 is mounted in a housing 231 to reciprocate therein. The supply pipe line 222, the first secondary air supply pipe line 222A and the bypass passage 224 are opened into a chamber 239 of the housing 231, and the supply pipe line 222A and the bypass passage 224 are opened and closed by a valve member 238. The valve member 238 is attached to the forward end of the row 237 and consequently the upper and lower conical surfaces are opposite to the open ends (the valve seats) of the pipe line 222A and the passage 224 opening into the chamber 239 of the housing 231. Pressure chambers 233 and 234 of the selector valve 230 are respectively connected to electromagnetic three-way valves 235 and 236. Thus the atmospheric pressure is introduced into one of the chambers and the intake manifold vacuum is introduced into the other chamber through the three-way valves 235 and 236 which are operated to change the pressure chambers into which the atmospheric air and the intake manifold vacuum are introduced. The electromagnetic three-way valves 235 and 236 are operated by an electric circuit 170 which may be the same as the counterpart in the first embodiment.

With the embodiment described above, a fixed amount of secondary air is always supplied into the exhaust pipe upstream of the three-way catalyst and also an intermittent secondary air is supplied into the exhaust pipe upstream of the three-way catalyst, thus increasing the A/F window range and particularly increasing the purification percentages of CO and HC by means of the fixed amount of secondary air supplied at all times.

While, in the above-described second embodiment, the secondary air supplied from the first secondary air supply pipe line into the exhaust pipe 107 takes a rectangular waveform, it has been confirmed that the intermittently supplied secondary air may take the form of sawtooth waveform to obtain the similar functional effects. Thus, the method of intermittently supplying secondary air will be described in connection with the apparatus shown in FIG. 20. By providing orifices 240 and 241 in the pipe lines respectively connecting the electromagnetic three-way valves 235 and 236 to the pressure chambers 233 and 234 of the selector valve 230, the pressure in the pressure chambers 233 and 234 may be caused to vary gradually and not rapidly and thereby supply the secondary air with the sawtooth waveform.

Figure 21:
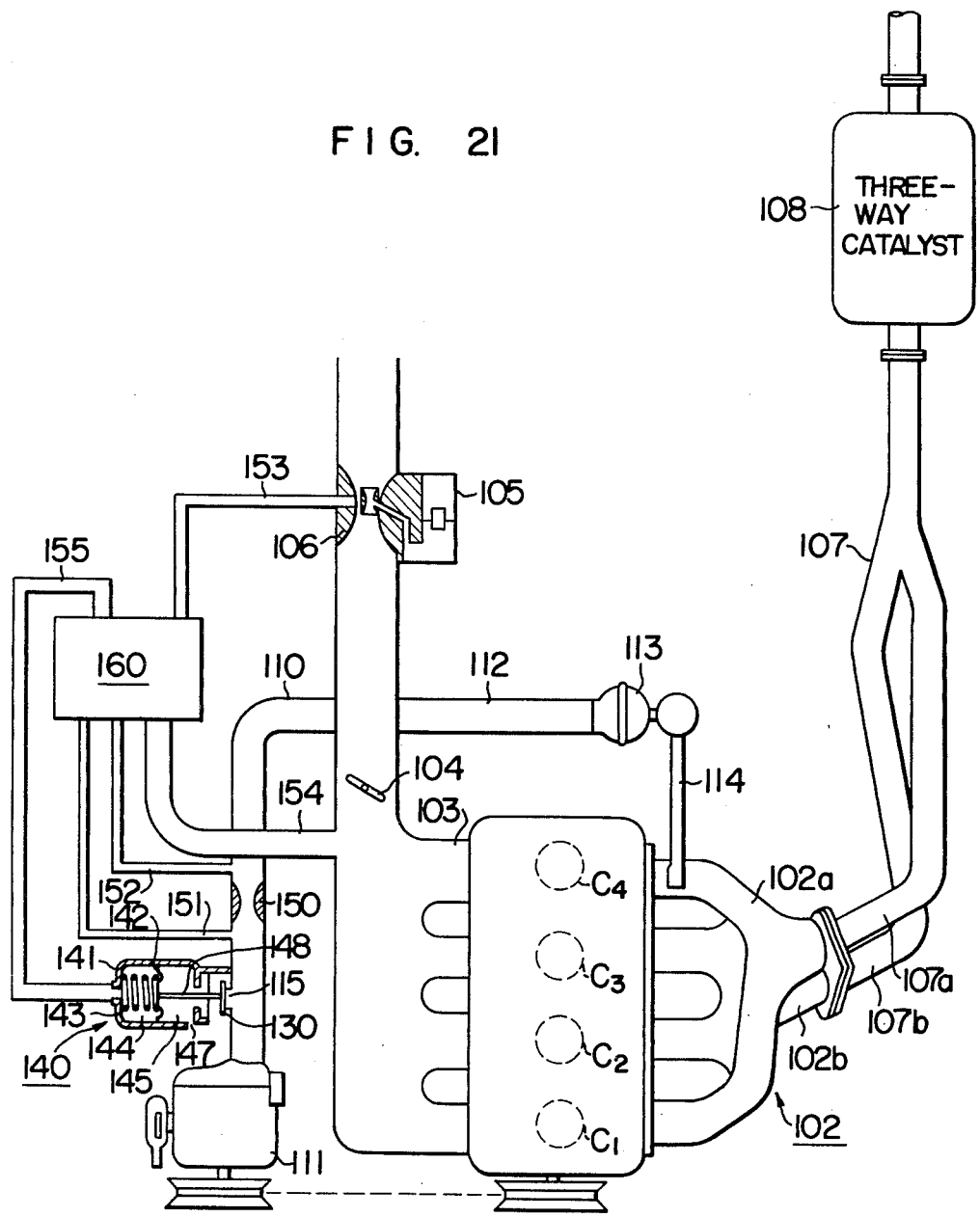
FIG. 21 is a schematic diagram showing the general construction of a third embodiment of the apparatus for performing the method of this invention.

The third embodiment shown in FIG. 21 will now be described. An internal combustion engine 100 used in this embodiment is a four-cycle, four-cylinder engine, assuming that the cylinders $C_1$ through $C_4$ of the engine are designated, from the below in the Figure, as the NO. 1 cylinder $C_1$, No. 2 cylinder $C_2$, No. 3 cylinder $C_3$ and No. 4 cylinder $C_4$, then the firing order is 1-3-4-2. A dual exhaust manifold 102 connected to the No. 1 and No. 4 cylinders $C_1$ and $C_4$ whose ignition timings are displaced 360° from each other. A second exhaust manifold 102b connected to the No. 2 and No. 3 cylinders $C_2$ and $C_3$ whose ignition timings are similarly displaced 360° from each other. The dual exhaust manifold 102 is connected to a dual exhaust pipe 107 comprising a first exhaust pipe 107a connected to the first exhaust manifold 102a and a second exhaust pipe 107b connected to the second exhaust manifold 102b. A three-way catalyst 108 is mounted at a position just downstream of the junction point of the first and second exhaust pipes 107a and 107b.

A carburetor 105 is adjusted in the same manner as the first embodiment so that the air-fuel ratio of the mixture supplied to the engine 100 is maintained constant and smaller than the stoichiometric ratio throughout the range of the operating conditions of the engine 100 or the control range of the purifying system.

In a secondary air supply unit 110, an injection nozzle 114 is opened only into the NO. 4 cylinder $C_4$ side of the first exhaust manifold 102a and consequently secondary air is injected from the injection nozzle 114 on the intake and power strokes of the NO. 4 cylinder $C_4$ as will be described later in detail. Also an actuator 140 and a comparator 160 are identical with the counterparts of the first embodiment. In this embodiment, a first control signal having a pressure value controlled by the comparator 160 is always introduced through a fifth pressure pipe 155 into a first pressure chamber 144 of the actuator 140, and the area of an escape passage 115 is controlled by a secondary air control valve 130, thus making the amount of secondary air supplied by the previously mentioned secondary air injection proportional to the intake air quantity. This secondary air quantity proportional to the intake air quantity is preset so that the average exhaust gas air-fuel ratio of the exhaust gases produced with the supply of secondary air and those produced with the supply of no secondary air falls in the hatched area of FIG. 1. Consequently, when secondary air is supplied, the resulting exhaust gas air-fuel ratio is greater than the stoichiometric ratio.

With the construction described above, the operation of the third embodiment apparatus is as follows. The apparatus utilizes the pulsating of the back pressure of the engine 100a. The first exhaust manifold 102a into which the injection nozzle 14 is opened is connected to the NO. 1 and NO. 4 cylinders $C_1$ and. The ignition timings of cylinders $C_1$ and $C_4$ are displaced 360° from each other and the NO. 4 cylinder $C_4$ is on the compression stroke when the NO. 1 cylinder $C_1$ is on the exhaust stroke. Accordingly, the back pressure in the first exhaust manifold 102a decreases during the intake and power strokes of the NO. 4 cylinder $C_4$. Consequently secondary air is supplied from the injection nozzle 114 into the NO. 4 cylinder $C_4$ side of the first exhaust manifold 102a during the intake and power strokes, respectively.

The exhaust gases from the NO. 4 cylinder $C_4$ are diluted by the supplied secondary air so that the thus diluted exhaust gases ($\lambda > 1$) are joined with the exhaust gases ($\lambda < 1$) from the NO. 1 cylinder $C_1$ and are then supplied into the first exhaust pipe 107a of the dual exhaust pipe 107. The experiments conducted by the inventors have shown that at the inlet side of the first exhaust pipe 107a the magnitude of the exhaust gas air-fuel ratio relative to the stoichiometric ratio varies as shown in FIG. 22a and it takes a pulselike form with a period corresponding to one cycle (intake-compression-power-exhaust) of the engine 100. The exhaust gases with the air-fuel ratio varying in a pulse-like manner are roughly mixed while flowing through the first exhaust pipe 107a and the resulting average exhaust gas air-fuel ratio is greater than the stoichiometric ratio ($\lambda = 1$). This results from the fact that as mentioned previously the supply of secondary air is adjusted in such a manner that the average exhaust gas air-fuel ratio at the inlet of the three-way catalyst 108 approximates the stoichiometric ratio.

The first exhaust pipe 107a through which flow the exhaust gases with the relatively large average exhaust gas air-fuel ratio and the second exhaust pipe 107b through which flow the exhaust gases with the relatively small average exhaust gas air-fuel ratio, meet together at a point in front of the inlet of the three-way catalyst 108. The experiments conducted have also shown that the magnitude of the airfuel ratio of the exhaust gases flowing into the three-way catalyst 108 varies in relation to the stoichiometric ratio as shown in FIG. 22b, and the variation takes a pulse-like form with a period corresponding to one half cycle of the engine 100.

While, in the third embodiment, secondary air is supplied only into the NO. 4 cylinder $C_4$ side of the first exhaust manifold 102a, this is not absolutely necessary, and it is possible to cause the air-fuel ratio of the exhaust gases at the inlet of the threeway catalyst 108 to vary in a pulse-like manner with a period corresponding to one half cycle of the engine 100 as in the case of the third embodiment by supplying secondary into any one of the four cylinders or by supplying secondary air into the two cylinders connected to one or the other of the first and second exhaust manifolds 102a and 102b.

Further, where a dual exhaust manifold is used comprising two exhaust manifolds each connected to a pair of cylinders whose ignition timings are displaced 180° from each other, secondary air may be supplied only into any one of the four cylinders or into the two cylinders connected to one or the other of the two exhaust manifolds so as to cause the airfuel ratio of the exhaust gases at the inlet of the three-way catalyst 108 to vary in a pulse-like manner with a period corresponding to one cycle of the engine 100 and thereby to obtain the similar effects as the above mentioned third embodiment.

Next, the fourth embodiment shown in FIG. 23 will be described. This embodiment differs from the third embodiment in that the air pump 111 is replaced with a reed valve 116 disposed in the air passage, that the escape passage 115 is closed with a bellows 149 and that a butterfly-type secondary air control valve 330 is disposed in the air passage. With this construction, the reed valve 116 comprising a relatively thin metal leaf opens and admits the flow of secondary air only when vacuum is present in the first exhaust manifold 102a. The secondary air control valve 330 is controlled by the comparator 160 and the actuator 140 to vary the area of the air passage and thereby to make the secondary air quantity proportional to the intake air quantity. With this embodiment, since secondary air is supplied only when vacuum is present in the first exhaust manifold 102a, the air-fuel ratio of the exhaust gases varies in a pulse-like manner and its frequency becomes the same as in the case of the third embodiment, thus ensuring the similar effects as the first embodiment.

With the embodiments described above, by virtue of the fact that the supply of secondary air is made proportional to the intake air quantity when the secondary air is supplied, where secondary air is supplied, the resulting exhaust gas air-fuel ratio is always maintained constant under the operating conditions of the engine 100 where the air-fuel ratio of the mixture supplied thereto is preset at a constant value, and consequently the resulting average exhaust gas air-fuel ratio is always maintained at a constant value. Thus, while, variation of the air-fuel ratio of the mixture supplied to the engine 100 under the steady state and transient operating conditions results in variation of the average exhaust gas air-fuel ratio, the range (the A/F window range) of the average exhaust gas air-fuel ratios which maintain high purification percentages is increased as mentioned previously, thus allowing the three-way catalyst to always operate effectively irrespective of variations in the average exhaust gas air-fuel ratio.

We claim:

1. In an internal combustion engine having three-way catalyst in an exhaust system of the engine, the three-way catalyst including an oxygen storage material, a method for operating the three-way catalyst comprising the steps of:
   supplying an air-fuel mixture having a fixed air-fuel ratio to the engine, said fixed air-fuel ratio being smaller than a stoichiometric air-fuel ratio;
   intermittently supplying a secondary air to the exhaust system of the engine upstream of said three-way catalyst at a frequency greater than 0.5 Hertz to thereby alternately vary air-fuel ratios of exhaust gases to a rich side in which the air-fuel ratio is smaller than the stoichiometric one and to a lean side in which air-fuel ratio is larger than the stoichiometric one, the amount of said secondary air being proportional to the amount of intake air, and the variation of the air-fuel ratios of the exhaust gases being displaced from the stoichiometric condition by equal amounts to the rich and lean sides with the ratio of the cycle of the displacement to the lean side to that to the rich side is 0.24/0.55.

2. A method for operating the three-way catalyst according to claim 1, wherein said three-way catalyst includes a catalyst bed of a monolithic type.

3. A method for operating the three-way catalyst according to claim 1 wherein the frequency of variation of the air-fuel ratio for varying the air-fuel ratio is in the range from 0.5 to 5 Hz, and said oxygen storage material comprises 20g/l of a cerium oxide added to said catalyst.

4. A method for operating the three-way catalyst according to claim 1 wherein the frequency of variation of the air-fuel ratio for varying the air-fuel ratio is in the range from 5 to 10 Hz and said oxygen storage material comprises 10g/l of a cerium oxide added to said catalyst.

5. In an apparatus for operating a three-way catalyst in an exhaust system of an internal combustion engine wherein an air-fuel mixture is supplied to the engine through a carburetor provided in an intake system of the engine, and wherein said three-way catalyst includes an oxygen storage material, the improvement wherein:
   said carburetor includes means for supplying an air-fuel mixture of a fixed air-fuel ratio to the engine through the intake system, said fixed air-fuel ratio being set to be smaller than a stoichiometric air-fuel ratio, and said apparatus further comprising:
   secondary air supply means, having an air pump and a secondary air supply pipe communicating with the exhaust system upstream of the three-way catalyst for controllably providing secondary air to said exhaust system;
   comparator means having a plurality of pressure chambers partitioned by diaphragms respectively communicating with the intake system and the secondary air supply pipe to receive signals indicative of an intake vacuum, an amount of intake air, and an amount of secondary air, said comparator means producing a first control signal indicative of an amount of secondary air to be supplied, proportional to the amount of intake air;
   electric control circuit means for producing an ON-OFF control electrical signal having a time period ratio of ON and OFF periods of 0.45 to 0.55;
   selector valve means communicating with said comparator means to receive said first control signal and communicating with the intake system to receive a second control signal indicative of the intake vacuum, said selector valve means being connected to said electric control circuit means to switch between said first control signal and said second control signal alternately under control of said ON-OFF control electrical signal; and
   actuator means, associated with said secondary air supply system and under control of said first and second control signals, for intermittently supplying the secondary air to said three-way catalyst, said actuator means supplying an amount of secondary air to said three-way catalyst proportional to the amount of intake air upon receipt of the first control signal, and inhibiting the supply of the secondary air during periods wherein the secondary signal is applied, thereby to vary the air-fuel ratios of exhaust gases alternately to a rich side and a lean side from a stoichiometric condition in accordance with a time period ratio of 0.45 to 0.55.

6. An apparatus for operating a three-way catalyst in an exhaust system of an internal combustion engine wherein an air-fuel mixture is supplied to the engine through a carburetor provided in an intake system of the engine, and wherein the three-way catalyst includes an oxygen storage material, said apparatus comprising:
a secondary air supply;
a first pipe line communicating between said secondary air supply and said exhaust system upstream of said three-way catalyst;
means including a second pipe line communicating between said secondary air supply and the exhaust system upstream of said three-way catalyst, for supplying secondary air constantly in an amount proportional to an intake air quantity;
means associated with said carburetor for supplying an air-fuel mixture of a predetermined air-fuel ratio richer than a stoichiometric condition to the engine through the intake system;
electric control circuit means for producing an ON-OFF control electrical signal having a time period of ON and OFF periods of 0.45 and 0.55; and
selector valve means for controlling the passage of the secondary air through said first pipe line to said exhaust system, said selector valve means having two pressure chambers partitioned by a diaphragm connected to a valve, said two pressure chambers alternately communicating with the atmosphere and the intake vacuum of the engine under control of an electromagnetic valve, said electromagnetic valve being controlled by said ON-OFF control electrical signal from said electric control circuit, thereby to supply the secondary air intermittently through said first pipe line to vary the air-fuel ratios of exhaust gases to a rich side and a lean side alternately with respect to a stoichiometric air-fuel ratio with a cycle of the displacement to the lean side to that to the rich side being 0.45 to 0.55.

7. A method for operating the three-way catalyst according to claim 1, wherein the variation of the air-fuel ratios of the exhaust gases is greater than one unit of air-fuel ratio to rich and lean sides from the stoichiometric condition.

8. A method for operating the three-way catalyst according to claim 1, further comprising the step of:
prior to intermittently supplying said secondary air, supplying an additional air continuously into said exhaust system upstream of said three-way catalyst.

* * * * *